United States Patent
Cheng et al.

(10) Patent No.: US 9,451,599 B2
(45) Date of Patent: Sep. 20, 2016

(54) METHOD FOR TRANSMITTING CONTROL INFORMATION, USER EQUIPMENT AND BASE STATION

(71) Applicant: HUAWEI TECHNOLOGIES CO., LTD., Shenzhen (CN)

(72) Inventors: Yan Cheng, Beijing (CN); Yongxia Lv, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 77 days.

(21) Appl. No.: 14/310,404

(22) Filed: Jun. 20, 2014

(65) Prior Publication Data

US 2014/0301324 A1  Oct. 9, 2014

Related U.S. Application Data

(63) Continuation of application No. PCT/CN2012/086827, filed on Dec. 18, 2012.

(30) Foreign Application Priority Data

Dec. 21, 2011  (CN) .......................... 2011 1 0433200

(51) Int. Cl.
*H04W 72/04* (2009.01)
*H04L 5/00* (2006.01)
(Continued)

(52) U.S. Cl.
CPC ........ *H04W 72/0413* (2013.01); *H04L 1/0026* (2013.01); *H04L 1/0073* (2013.01);
(Continued)

(58) Field of Classification Search
CPC ..................... H04W 72/0413; H04L 5/005

IPC .................................................. H04W 72/0413
See application file for complete search history.

(56) References Cited

U.S. PATENT DOCUMENTS

| 8,982,804 B2* | 3/2015 | Lee ................... H04W 72/0406 370/329 |
| 2010/0177694 A1* | 7/2010 | Yang ................. H04W 74/0833 370/328 |

(Continued)

FOREIGN PATENT DOCUMENTS

| CN | 101257369 A | 9/2008 |
| CN | 101800620 A | 8/2010 |

(Continued)

OTHER PUBLICATIONS

Chinese Search report issued Mar. 25, 2015 in corresponding Chinese Patent Application No. 201110433200.2.

(Continued)

*Primary Examiner* — Rasheed Gidado
(74) *Attorney, Agent, or Firm* — Staas & Halsey LLP

(57) ABSTRACT

Embodiments of the present application provide a method for transmitting control information, a user equipment and a base station. The method includes: acquiring a resource index of a physical uplink control channel PUCCH; acquiring a sequence index of an orthogonal sequence of the PUCCH according to the resource index, and acquiring the orthogonal sequence according to the sequence index; acquiring a cyclic shift of a reference signal of the PUCCH according to the sequence index; and transmitting the UCI to the base station on the PUCCH according to the orthogonal sequence and the cyclic shift. In the embodiments of the present application, a cyclic shift of a reference signal of a PUCCH channel for transmitting UCI is acquired according to a sequence index, and the UCI is transmitted on the PUCCH according to the cyclic shift and a corresponding orthogonal sequence, which can enhance transmission performance of the UCI.

10 Claims, 4 Drawing Sheets

(51) Int. Cl.
  *H04L 1/18*  (2006.01)
  *H04L 1/00*  (2006.01)
  *H04L 1/16*  (2006.01)

(52) U.S. Cl.
  CPC ........... *H04L1/1861* (2013.01); *H04L 5/0055* (2013.01); *H04L 5/0057* (2013.01); *H04L 1/1671* (2013.01); *H04L 5/0016* (2013.01); *H04L 5/0051* (2013.01)

(56) References Cited

U.S. PATENT DOCUMENTS

| | | | |
|---|---|---|---|
| 2011/0141941 A1* | 6/2011 | Lee | H04L 1/0038 370/252 |
| 2011/0142000 A1 | 6/2011 | Han et al. | |
| 2011/0228877 A1 | 9/2011 | Han et al. | |
| 2011/0242997 A1* | 10/2011 | Yin | H04L 1/0031 370/252 |
| 2012/0093067 A1* | 4/2012 | Lv | H04B 7/15542 370/315 |
| 2012/0250648 A1 | 10/2012 | Xia et al. | |
| 2013/0148617 A1* | 6/2013 | Park | H04L 1/1861 370/329 |
| 2013/0272258 A1* | 10/2013 | Lee | H04B 7/0413 370/329 |

FOREIGN PATENT DOCUMENTS

| | | |
|---|---|---|
| CN | 102119497 A | 7/2011 |
| WO | 2012/023741 A2 | 2/2012 |

OTHER PUBLICATIONS

Chinese Office Action issued Apr. 3, 2015 in corresponding Chinese Patent Application No. 201110433200.2.
Extended European Search Report issued Oct. 17, 2014 in corresponding European Patent Application No. 12860570.6.
International Search Report issued Dec. 18, 2012 in corresponding International Patent Application No. PCT/CN2012/086827.

* cited by examiner

METHOD FOR TRANSMITTING CONTROL INFORMATION, USER EQUIPMENT AND BASE STATION

CROSS-REFERENCE TO RELATED APPLICATIONS

This application is a continuation of International Application No. PCT/CN2012/086827, filed on Dec. 18, 2012, which claims priority to Chinese Patent Application No. 201110433200.2, filed on Dec. 21, 2011, both of which are hereby incorporated by reference in their entireties.

TECHNICAL FIELD

Embodiments of the present application relate to the field of wireless communications, and in particular, to a method for transmitting control information, a user equipment and a base station.

BACKGROUND

LTE-A (Long Term Evolution-Advanced) is a further evolved and enhanced system of a 3GPP LTE system. In an LTE-A system, to meet the peak data rate requirement of the fourth generation communications technologies of the International Telecommunication Union, a carrier aggregation (CA) technology is introduced, which is also referred to as a spectrum aggregation technology or a bandwidth extension technology. In carrier aggregation, spectrums of two or more component carriers are aggregated to obtain a wider transmission bandwidth, where the spectrums of each component carrier may be adjacent continuous spectrums, or may also be nonadjacent spectrums in the same frequency band, or even discontinuous spectrums in different frequency bands. An LTE Rel-8/9 user equipment (UE) can only access one of the component carriers for data reception and transmission, whereas an LTE-A user equipment can access a plurality of component carriers at the same time to perform data reception and transmission according to capability and a service requirement of the LTE-A user equipment.

To support technologies such as dynamic scheduling and downlink multiple input multiple output (MIMO) transmission and hybrid automatic repeat request, a terminal needs to feed back to a base station uplink control information (UCI), which includes channel state information (CSI), hybrid automatic repeat request-acknowledgment information (HARQ-ACK), and a scheduling request (SR), where HARQ-ACK may also be simply called ACK (acknowledgment)/NACK (negative acknowledgment). In LTE-A, because the carrier aggregation technology is introduced, when a user equipment accesses a plurality of downlink component carriers at the same time to receive downlink data, for each downlink component carrier, the channel state information of the user equipment needs to be fed back in an uplink direction, and for data scheduled on each downlink component carrier, a hybrid automatic repeat request-acknowledgment of the user equipment also needs to be fed back in the uplink direction. Therefore, the channel state information and the hybrid automatic repeat request-acknowledgment may need to be reported on one uplink subframe at the same time, in where the channel state information to be reported may correspond to one or a plurality of downlink carriers, and the hybrid automatic repeat request-acknowledgment to be reported may also correspond to one or a plurality of downlink carriers.

The CSI includes periodic CSI and non-periodic CSI. The periodic CSI includes information such as a channel quality indicator (CQI), a precoding matrix indicator (PMI), a rank indication (RI), and a precoding type indicator (PTI). The periodic CSI has multiple reporting modes on a physical uplink control channel (PUCCH). For example, in an LTE Rel-10 system, reporting modes of the periodic CSI include mode 1-0, mode 1-1, mode 2-0 and mode 2-1. One reporting mode corresponds to multiple reporting types, and different reporting types correspond to different report content. For example, in the LTE Rel-10 system, the periodic CSI includes the following several reporting types: type 1 supporting subband CQI feedback selected by a user equipment; type 1a supporting subband CQI feedback and second PMI feedback; type 2a supporting broadband PMI feedback; type 3 supporting RI feedback; type 4 supporting broadband CQI feedback; type 5 supporting RI feedback and wideband PMI feedback; and type 6 supporting RI feedback and PTI feedback.

A base station semi-statically configures a reporting mode, a reporting period and a subframe offset of the periodic CSI of each carrier through high-layer signaling. A user equipment determines, according to the reporting mode indicated by the high-layer signaling, a reporting type corresponding to a CSI to be reported, and determines, according to the reporting period and the subframe offset indicated by the high-layer signaling, a reporting moment for CSI of each reporting type. If detecting transmission on a physical downlink share channel (PDSCH) or a physical downlink control channel (PDCCH) used for indicating semi-persistent scheduling release (SPS release), a UE needs to feed back HARQ-ACK. Therefore, in a scenario of LTE-A carrier aggregation, the CSI and HARQ-ACK may need to be reported at the same time on one uplink subframe.

In an actual scenario, PDCCH loss may occur, that is, a base station sends a PDCCH to a UE, but the UE fails to detect the PDCCH, and in this case, the UE does not feed back HARQ-ACK. If in this case, periodic CSI also needs to be fed back, the UE only sends the periodic CSI to the base station, and the base station considers that the UE has fed back the periodic CSI and the HARQ-ACK at the same time, so that the base station possibly performs decoding by using an incorrect method. As a result, in one aspect, the periodic CSI cannot be correctly decoded, and in another aspect, the base station may misinterpret a part of CSI information as ACK/NACK information, causing a problem of misinterpreting discontinuous transmission (DTX) as an ACK. The DTX may indicate that the user equipment does not receive PDSCH transmission, that is, downlink data scheduled to the UE by the base station is lost. If the DTX is misinterpreted as the ACK, the base station considers that the UE receives the PDSCH and correctly receives downlink data, thereby lowering UCI transmission performance.

SUMMARY

Embodiments of the present application provide a method for transmitting control information, a user equipment and a base station, which can enhance transmission performance of UCI.

In one aspect, a method for transmitting control information is provided and includes: acquiring a resource index of a physical uplink control channel PUCCH, where the PUCCH is used for transmitting uplink control information UCI; acquiring a sequence index of an orthogonal sequence of the PUCCH according to the resource index, and acquiring the orthogonal sequence according to the sequence index; acquiring a cyclic shift of a reference signal of the PUCCH according to the sequence index; and transmitting the UCI to a base station on the PUCCH according to the orthogonal sequence and the cyclic shift.

In another aspect, a method for transmitting control information is provided and includes: acquiring a resource index of a physical uplink control channel PUCCH on which a user equipment UE transmits uplink control information UCI; acquiring a sequence index of an orthogonal sequence of the PUCCH according to the resource index, and acquiring the orthogonal sequence according to the sequence index; acquiring a cyclic shift of a reference signal of the PUCCH according to the sequence index; and receiving the UCI transmitted by the UE on the PUCCH according to the orthogonal sequence and the cyclic shift.

In another aspect, a user equipment is provided and includes: a processing unit, configured to acquire a resource index of a physical uplink control channel PUCCH, where the PUCCH is used for transmitting uplink control information UCI; acquire a sequence index of an orthogonal sequence of the PUCCH according to the resource index, and acquire the orthogonal sequence according to the sequence index; and acquire a cyclic shift of a reference signal of the PUCCH according to the sequence index; and a transmission unit, configured to transmit the UCI to a base station on the PUCCH according to the orthogonal sequence and the cyclic shift.

In another aspect, a base station is provided and includes: a processing unit, configured to acquire a resource index of a physical uplink control channel PUCCH on which a user equipment UE transmits uplink control information UCI; acquire a sequence index of an orthogonal sequence of the PUCCH according to the resource index, and acquire the orthogonal sequence according to the sequence index; and acquire a cyclic shift of a reference signal of the PUCCH according to the sequence index; and a receiving unit, configured to receive the UCI transmitted by the UE on the PUCCH according to the orthogonal sequence and the cyclic shift.

In the embodiments of the present application, a cyclic shift of a reference signal of a PUCCH channel for transmitting UCI is acquired according to a sequence index, and the UCI is transmitted on the PUCCH according to the cyclic shift and a corresponding orthogonal sequence, which can enhance transmission performance of the UCI.

BRIEF DESCRIPTION OF DRAWINGS

To describe the technical solutions according to the embodiments of the present application more clearly, the following briefly introduces accompanying drawings required for describing the embodiments. Apparently, the accompanying drawings in the following description show merely some embodiments of the present application, and persons of ordinary skill in the art may derive other drawings according to the accompanying drawings without creative efforts.

DESCRIPTION OF EMBODIMENTS

The following clearly and completely describes the technical solutions in the embodiments of the present application with reference to the accompanying drawings in the embodiments of the present application. Apparently, the embodiments to be described are merely a part rather than all of the embodiments of the present application. All other embodiments obtained by persons skilled in the art based on the embodiments of the present application without creative efforts shall fall within the protection scope of the present application.

The technical solutions of the present application may be applied to various communications systems, such as GSM, a Code Division Multiple Access (CDMA) system, Wideband Code Division Multiple Access (WCDMA), General Packet Radio Service (GPRS), and Long Term Evolution (LTE).

A user equipment (UE), which may also be referred to as a mobile terminal, a mobile user equipment, and the like, may communicate with one or more core networks through a radio access network (for example, RAN, Radio Access Network). The user equipment may be a mobile terminal, such as a mobile phone (or referred to as a "cellular" phone), and may be a computer equipped with a mobile terminal, for example, may be a portable, pocket-type, handheld, computer built-in or on-board mobile device, which exchange speech and/or data with the radio access network.

A base station may be a Base Transceiver Station (BTS) in GSM or CDMA, may also be a NodeB in WCDMA, and may further be an evolved Node B (eNB or e-NodeB) in LTE, which is not limited in the present application.

Figure 1:
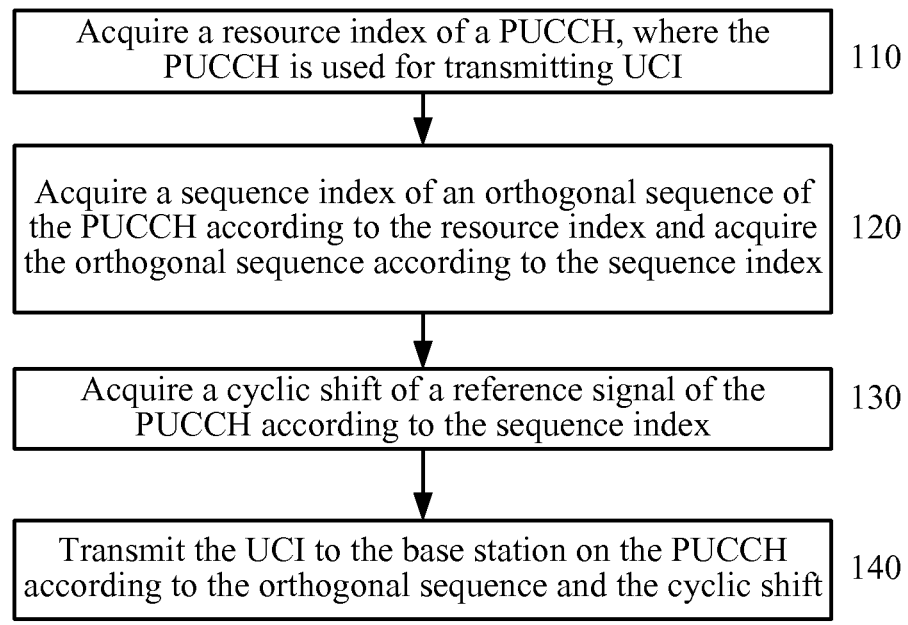
FIG. 1 is a schematic flow chart of a method for transmitting control information according to an embodiment of the present application.

FIG. 1 is a schematic flow chart of a method for transmitting control information according to an embodiment of the present application. The method in FIG. 1 is executed by a UE.

110. Acquire a resource index of a physical uplink control channel (PUCCH), where the PUCCH is used for transmitting uplink control information (UCI).

120. Acquire a sequence index of an orthogonal sequence of the PUCCH according to the resource index, and acquire the orthogonal sequence according to the sequence index.

130. Acquire a cyclic shift of a reference signal of the PUCCH according to the sequence index.

140. Transmit the UCI to the base station on the PUCCH according to the orthogonal sequence and the cyclic shift.

In the embodiment of the present application, a cyclic shift of a reference signal of a PUCCH channel for transmitting UCI is acquired according to a sequence index, and the UCI is transmitted on the PUCCH according to the cyclic shift and a corresponding orthogonal sequence, which can enhance transmission performance of the UCI.

Optionally, as one embodiment, in step 130, a UE may determine the cyclic shift of the reference signal of the PUCCH according to the sequence index and the UCI.

In the embodiment of the present application, a cyclic shift of a reference signal of a PUCCH is determined according to a sequence index and UCI, and the UCI is transmitted on the PUCCH according to the cyclic shift and a corresponding orthogonal sequence, so that the transmitted UCI can be distinguished through a cyclic shift, which can enhance transmission performance of the UCI.

Optionally, as another embodiment, in step 130, if the UCI only includes periodic channel state information (CSI), the UE may determine that the cyclic shift is a first cyclic shift corresponding to the sequence index. If the UCI includes periodic CSI and a hybrid automatic repeat request-acknowledgment (HARQ-ACK) or the UCI includes periodic CSI, HARQ-ACK and a scheduling request (SR), the UE may determine that the cyclic shift is a second cyclic shift corresponding to the sequence index. For example, for a given reference signal symbol, that is, a pilot symbol, or for a given time domain SC-FDMA (single carrier-frequency division multiple access) symbol used for transmitting a reference signal, one sequence index may correspond to two cyclic shifts, including a first cyclic shift and a second cyclic shift, that is, two cyclic shifts used for the pilot symbol may be obtained from one sequence index. It should be noted that, in the embodiment of the present application, the first cyclic shift corresponding to the sequence index may refer that the first cyclic shift and the sequence index are correlated, or it may be understood that the first cyclic shift is obtained through calculation according to one parameter (or some parameters) (for example, a cyclic shift calculation factor) corresponding to the sequence index. In the embodiment of the present application, the second cyclic shift corresponding to the sequence index is similarly understood, which is not repeatedly described herein. In addition, in the embodiment of the present application, the first cyclic shift and the second cyclic shift may correspond to a same second slot spreading coefficient.

In the embodiment of the present application, one sequence index of a PUCCH corresponds to two cyclic shifts of a reference signal, and the two cyclic shifts are used for transmission of periodic CSI only and simultaneous transmission of periodic CSI and HARQ-ACK, respectively, so as to distinguish a case of transmitting periodic CSI only from a case of transmitting periodic CSI and HARQ-ACK at the same time, which can enhance transmission performance of the UCI.

Optionally, as another embodiment, in step 130, the UE may acquire, according to correspondence between a sequence index and a cyclic shift calculation factor of a reference signal, a first cyclic shift calculation factor and a second cyclic shift calculation factor corresponding to the sequence index. The UE may acquire a first cyclic shift according to the first cyclic shift calculation factor, and acquire a second cyclic shift according to the second cyclic shift calculation factor. The UE may acquire the cyclic shift of the reference signal of the PUCCH according to the UCI.

Optionally, as another embodiment, in step 130, the UE may determine, according to the sequence index and the UCI, a cyclic shift calculation factor of the reference signal of the PUCCH, if the UCI only includes periodic CSI, determine that the cyclic shift calculation factor of the reference signal of the PUCCH is the first cyclic shift calculation factor corresponding to the sequence index, and if the UCI includes periodic CSI and HARQ-ACK or the UCI includes periodic CSI, HARQ-ACK and an SR, determine that the cyclic shift calculation factor of the reference signal of the PUCCH is a second cyclic shift calculation factor corresponding to the sequence index. The UE may acquire, according to the cyclic shift calculation factor, the cyclic shift of the reference signal of the PUCCH.

Optionally, as another embodiment, in step 130, the UE may acquire, according to correspondence between a sequence index and a cyclic shift calculation factor of a reference signal, a first cyclic shift calculation factor corresponding to the sequence index or a second cyclic shift calculation factor corresponding to the sequence index.

Optionally, as another embodiment, in step 130, a difference between a value of the first cyclic shift calculation factor and a value of the second cyclic shift calculation factor may be 1.

Optionally, as another embodiment, in step 130, correspondence between a sequence index and a cyclic shift calculation factor of a reference signal may be: at a given spreading coefficient, one sequence index corresponds to two cyclic shift calculation factors, and at a given spreading coefficient, a distance between cyclic shift calculation factors corresponding to different sequence indexes is greater than or equal to a distance between two cyclic shift calculation factors corresponding to a same sequence index, or a minimum value of the distance between cyclic shift calculation factors corresponding to different sequence indexes is 2.

Optionally, as another embodiment, in step 130, in a case that the PUCCH is in PUCCH format 3, one example of the correspondence between a sequence index and a cyclic shift calculation factor of a reference signal is shown in Table 1:

TABLE 1

| $n_{oc}^{(\tilde{p})}$ | $n'_{\tilde{p}}(n_s)$ | |
|---|---|---|
| | $N_{SF,1} = 5$ | $N_{SF,1} = 4$ |
| 0 | 0/1 | 0/1 |
| 1 | 3/4 | 3/4 |
| 2 | 6/7 | 6/7 |
| 3 | 8/9 | 9/10 |
| 4 | 10/11 | N/A |

$n_{oc}^{(\tilde{p})}$ is the sequence index, $n'_{\tilde{p}}(n_s)$ is the cyclic shift calculation factor, $N_{SF,1}$ is the spreading coefficient of a second slot of the PUCCH, N/A (Not applicable) indicates not applicable, and "/" indicates "or". It should be noted that, the embodiment of the present application does not limit specific meaning of N/A, which, for example, may further be meanings such as not available, not present and not obtainable.

In the embodiment of the present application, the distance between the cyclic shift calculation factors corresponding to different sequence indexes should be as large as possible to guarantee that a distance between the cyclic shifts of the reference signals of different users is as large as possible, so as to achieve better orthogonality and reduce interference between different users.

Optionally, as another embodiment, in step 130, in the case that the PUCCH is in PUCCH format 3, another example of the correspondence between a sequence index and a cyclic shift calculation factor of a reference signal is shown in Table 2:

TABLE 2

| $n_{oc}^{(\tilde{p})}$ | $n'_{\tilde{p}}(n_s)$ | |
|---|---|---|
| | $N_{SF,1} = 5$ | $N_{SF,1} = 4$ |
| 0 | 0/1 | 0/1 |
| 1 | 3/4 | 3/4 |
| 2 | 6/7 | 6/7 |
| 3 | 9/10 | 9/10 |

$n_{oc}^{(\tilde{p})}$ is the sequence index, $n'_p(n_s)$ is a cyclic shift calculation factor, $N_{SF,1}$ is the spreading coefficient of a second slot of the PUCCH, and "/" indicates "or".

In the embodiment of the present application, a minimum distance between random two cyclic shift calculation factors corresponding to different sequence indexes is 2, which can guarantee orthogonality between reference signal sequences of different users, so as to further reduce interference between different users.

Optionally, as another embodiment, in step 140, if the UCI includes periodic CSI and HARQ-ACK, the UE may acquire a resource occupied by the periodic CSI and acquire a resource occupied by the HARQ-ACK. Channel encoding may be performed on the periodic CSI according to the resource occupied by the periodic CSI to obtain an encoded bit sequence of the periodic CSI, and channel encoding is performed on the HARQ-ACK according to the resource occupied by the HARQ-ACK to obtain an encoded bit sequence of the HARQ-ACK. The encoded bit sequence of the periodic CSI and the encoded bit sequence of the HARQ-ACK may be transmitted to the base station on the PUCCH according to the orthogonal sequence and the cyclic shift.

Optionally, as another embodiment, in step 140, the UE may collect encoded bits in the encoded bit sequence of the periodic CSI and encoded bits in the encoded bit sequence of the HARQ-ACK, so as to obtain an encoded bit sequence of the UCI. The UE may transmit the encoded bit sequence of the UCI to the base station on the PUCCH according to the orthogonal sequence and the cyclic shift.

a) Optionally, as another embodiment, in step 140, the resource may be the number of encoded bits, the UE may acquire, according to the formula $Q_{ACK}=\lceil(O_{ACK}*24*\beta'_{offset})/(O_{CSI}+O_{ACK})\rceil*Q_m$, the number of encoded bits occupied by the HARQ-ACK, and acquire, according to the formula $Q_{CSI}=48-Q_{ACK}$, the number of encoded bits occupied by the periodic CSI, where $Q_{ACK}$ is the number of encoded bits occupied by the HARQ-ACK, $Q_{CSI}$ is the number of encoded bits occupied by the periodic CSI, $\beta'_{offset}$ is a value semi-statically configured for the UE by the base station through high-layer signaling or a preset value or a value dynamically specified for the UE by the base station, $O_{ACK}$ is the number of information bits of the HARQ-ACK, $O_{CSI}$ is the number of information bits of the periodic CSI, and $Q_m$ is a modulation order of the UCI. Alternatively, when the resource is the number of modulation symbols, the UE may acquire, according to the formula $Q'_{ACK}=\lceil(O_{ACK}*24*\beta'_{offset})/(O_{CSI}+O_{ACK})\rceil$, the number of modulation symbols occupied by the HARQ-ACK, and acquire, according to the formula $Q'_{CSI}=24-Q'_{ACK}$, the number of modulation symbols occupied by the periodic CSI, where $Q'_{ACK}$ is the number of modulation symbols occupied by the HARQ-ACK, $Q'_{CSI}$ is the number of modulation symbols occupied by the periodic CSI, $\beta'_{offset}$ is a value semi-statically configured for the UE by the base station through high-layer signaling or a preset value or a value dynamically specified for the UE by the base station, $O_{ACK}$ is the number of information bits of the HARQ-ACK, $O_{CSI}$ is the number of information bits of the periodic CSI, and $Q_m$ is a modulation order of the UCI.

Optionally, as another embodiment, in step 140, the UE may divide the encoded bit sequence of the periodic CSI into a first part of the encoded bit sequence of the periodic CSI and a second part of the encoded bit sequence of the periodic CSI, and divide the encoded bit sequence of the HARQ-ACK into a first part of the encoded bit sequence of the HARQ-ACK and a second part of the encoded bit sequence of the HARQ-ACK. The first part of the encoded bit sequence of the periodic CSI, the second part of the encoded bit sequence of the periodic CSI, the first part of the encoded bit sequence of the HARQ-ACK, and the second part of the encoded bit sequence of the HARQ-ACK may be collected, so as to obtain an encoded bit sequence of the UCI.

Currently, when periodic CSI and HARQ-ACK are transmitted on a physical uplink control channel at the same time, problems of how to properly allocate resources and how to map the periodic CSI and the HARQ-ACK on time and frequency resources also need to be solved, so as to better guarantee transmission performance of the periodic CSI and the HARQ-ACK. In the embodiment of the present application, the periodic CSI and the HARQ-ACK are both distributed on the time and frequency resources of two slots of the PUCCH, and therefore better time and frequency diversity gains can be obtained for both the periodic CSI and the HARQ-ACK, so as to guarantee the transmission performance of the periodic CSI and the HARQ-ACK.

Optionally, as another embodiment, in step 140, the UE may perform collection in the following order: the first part of the encoded bit sequence of the HARQ-ACK, the first part of the encoded bit sequence of the periodic CSI, the second part of the encoded bit sequence of the HARQ-ACK, and the second part of the encoded bit sequence of the periodic CSI.

Optionally, as another embodiment, in step 140, if the encoded bit sequence of the periodic CSI is $q_0^{CSI}, q_1^{CSI}, q_2^{CSI}, \ldots, q_{Q_{CSI}-1}^{CSI}$, the first part of the encoded bit sequence of the periodic CSI is $q_0^{CSI}, q_1^{CSI}, q_2^{CSI}, \ldots, q_{(12-\lceil Q_{ACK}/2\rceil)*-1}^{CSI}$, and the second part of the encoded bit sequence of the periodic CSI $q_{(12-\lceil Q_{ACK}/2\rceil)*2}^{CSI}, q_{(12-\lceil Q_{ACK}/2\rceil)*2+1}^{CSI}, \ldots q_{Q_{CSI}-1}^{CSI}$. If the encoded bit sequence of the HARQ-ACK is $q_0^{ACK}, q_1^{ACK}, q_2^{ACK}, \ldots, q_{Q_{ACK}-1}^{ACK}$, the first part of the encoded bit sequence of the HARQ-ACK $q_0^{ACK}, q_1^{ACK}, q_2^{ACK}, \ldots, q_{\lceil Q_{ACK}/2\rceil*2-1}^{ACK}$, and the second part of the encoded bit sequence of the HARQ-ACK is $q_{\lceil Q_{ACK}/2\rceil*2}^{ACK}, q_{\lceil Q_{ACK}/2\rceil*2+1}^{ACK}, \ldots q_{Q_{ACK}-1}^{ACK}$.

Optionally, as another embodiment, in step 140, the UE may determine a first UCI encoded bit sequence and a second UCI encoded bit sequence, where the number of encoded bits of the first UCI encoded bit sequence is smaller than or equal to the number of encoded bits of the second UCI encoded bit sequence. The first UCI encoded bit sequence may be divided into a first part of the first UCI encoded bit sequence and a second part of the first UCI encoded bit sequence, and the second UCI encoded bit sequence may be divided into a first part of the second UCI encoded bit sequence and a second part of the second UCI encoded bit sequence. By taking encoded bits of the number being a modulation order $Q_m$ of the UCI as a granularity, encoded bits are alternately selected from the first part of the first UCI encoded bit sequence and the first part of the second UCI encoded bit sequence, and encoded bits are first selected from the first part of the first UCI encoded bit sequence, so as to obtain a first part of the encoded bit sequence of the UCI. By taking encoded bits of the number being the modulation order $Q_m$ as a granularity, encoded bits are alternately selected from the second part of the first UCI encoded bit sequence and the second part of the second UCI encoded bit sequence, and encoded bits are first selected from the second part of the first UCI encoded bit sequence, so as to obtain a second part of the encoded bit sequence of the UCI. The first part of the encoded bit sequence of the UCI and the second part of the encoded bit sequence of the UCI may be serially connected to obtain the encoded bit sequence of the UCI.

Currently, when periodic CSI and HARQ-ACK are transmitted on a physical uplink control channel at the same time, problems of how to properly allocate resources and how to map the periodic CSI and the HARQ-ACK on time and frequency resources also need to be solved, so as to better guarantee transmission performance of the periodic CSI and the HARQ-ACK. In the embodiment of the present application, the periodic CSI and the HARQ-ACK are distributed on the frequency domain resources of each slot of the PUCCH more discretely to obtain more frequency diversity gains, so as to further enhance the transmission performance of the periodic CSI and the HARQ-ACK.

Optionally, as another embodiment, in step 140, if the number of encoded bits in the encoded bit sequence of the periodic CSI is smaller than the number of encoded bits in the encoded bit sequence of the HARQ-ACK, the UE may determine that the first UCI encoded bit sequence is the encoded bit sequence of the periodic CSI and the second UCI encoded bit sequence is the encoded bit sequence of the HARQ-ACK. Alternatively, if the number of encoded bits in the encoded bit sequence of the periodic CSI is greater than the number of encoded bits in the encoded bit sequence of the HARQ-ACK, the UE may determine that the first UCI encoded bit sequence is the encoded bit sequence of the HARQ-ACK and the second UCI encoded bit sequence is the encoded bit sequence of the periodic CSI. Alternatively, if the number of encoded bits in the encoded bit sequence of the periodic CSI is equal to the number of encoded bits in the encoded bit sequence of the HARQ-ACK, the UE may determine that the first UCI encoded bit sequence is the encoded bit sequence of the periodic CSI and the second UCI encoded bit sequence is the encoded bit sequence of the HARQ-ACK, or determine that the first UCI encoded bit sequence is the encoded bit sequence of the HARQ-ACK and the second UCI encoded bit sequence is the encoded bit sequence of the periodic CSI.

Figure 2:
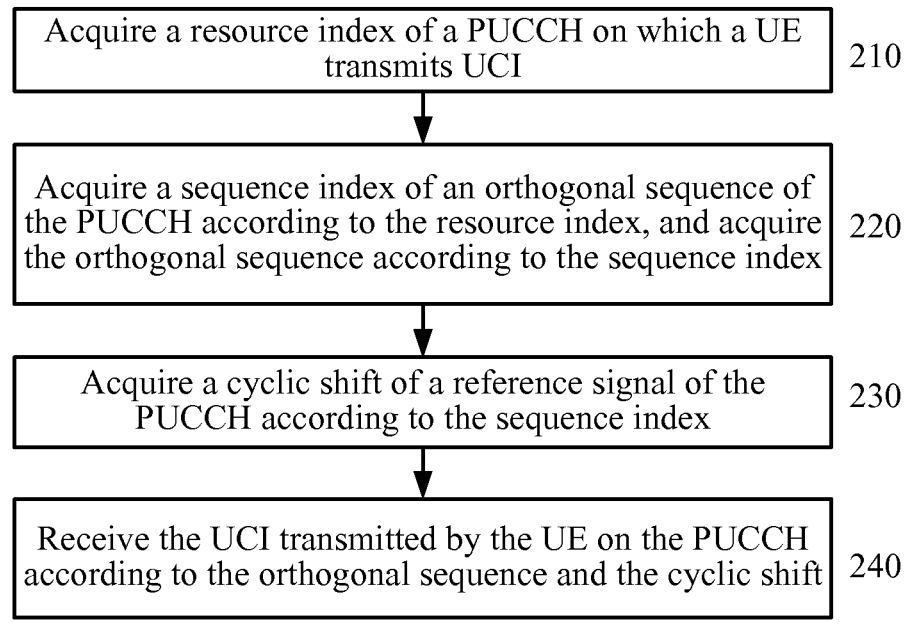
FIG. 2 is a schematic flow chart of a method for transmitting control information according to another embodiment of the present application.

FIG. 2 is a schematic flow chart of a method for transmitting control information according to another embodiment of the present application. The method in FIG. 2 is executed by a base station.

210. Acquire a resource index of a PUCCH on which a UE transmits UCI.

220. Acquire a sequence index of an orthogonal sequence of the PUCCH according to the resource index, and acquire the orthogonal sequence according to the sequence index.

230. Acquire a cyclic shift of a reference signal of the PUCCH according to the sequence index.

240. Receive the UCI transmitted by the UE on the PUCCH according to the orthogonal sequence and the cyclic shift.

In the embodiment of the present application, a cyclic shift of a reference signal of a PUCCH channel for transmitting UCI is acquired according to a sequence index, and the UCI is transmitted on the PUCCH according to the cyclic shift and a corresponding orthogonal sequence, which can enhance transmission performance of the UCI.

Optionally, as one embodiment, in step 240, the base station may determine a type of the UCI according to the cyclic shift of the reference signal of the PUCCH, if the cyclic shift of the reference signal of the PUCCH is a first cyclic shift corresponding to the sequence index, may determine that the type of the UCI is periodic CSI, if the cyclic shift of the reference signal of the PUCCH is a second cyclic shift corresponding to the sequence index, may determine that the type of the UCI is periodic CSI and HARQ-ACK, and receive the UCI transmitted by the UE on the PUCCH according to the orthogonal sequence, the cyclic shift and the type of the UCI. It should be noted that, the type of the UCI described herein can refer to the type of uplink control information included in the UCI. For example, the type of the UCI may be periodic CSI, or periodic CSI and HARQ-ACK, or periodic CSI, HARQ-ACK and an SR.

In the embodiment of the present application, the type of the UCI is determined by the cyclic shift of the reference signal of the PUCCH, so that the transmitted UCI can be distinguished through a cyclic shift, which can enhance transmission performance of the UCI.

Optionally, as another embodiment, in step 230, the base station may acquire, according to correspondence between a sequence index and a cyclic shift calculation factor of a reference signal, a first cyclic shift calculation factor and a second cyclic shift calculation factor corresponding to the sequence index. The first cyclic shift corresponding to the sequence index may be acquired according to the first cyclic shift calculation factor, and the second cyclic shift corresponding to the sequence index may be acquired according to the second cyclic shift calculation factor. The cyclic shift of the reference signal of the PUCCH may be acquired according to the first cyclic shift and the second cyclic shift.

Optionally, as another embodiment, in step 230, a difference between a value of the first cyclic shift calculation factor and a value of the second cyclic shift calculation factor may be 1.

Optionally, as another embodiment, in step 230, correspondence between a sequence index and a cyclic shift calculation factor of a reference signal may be at a given spreading coefficient, one sequence index corresponds to two cyclic shift calculation factors. Also, at a given spreading coefficient, a distance between cyclic shift calculation factors corresponding to different sequence indexes is greater than or equal to a distance between two cyclic shift calculation factors corresponding to a same sequence index, or a minimum value of the distance between cyclic shift calculation factors corresponding to different sequence indexes is 2.

Optionally, as another embodiment, in step 230, in the case that the PUCCH is in PUCCH format 3, one example of the correspondence between a sequence index and a cyclic shift calculation factor of a reference signal is shown in Table 1.

In the embodiment of the present application, the distance between the cyclic shift calculation factors corresponding to different sequence indexes should be as large as possible to guarantee that a distance between the cyclic shifts of the reference signals of different users is as large as possible, so as to achieve better orthogonality and reduce interference between different users.

Optionally, as another embodiment, in step 230, in the case that the PUCCH is in PUCCH format 3, another example of the correspondence between a sequence index and a cyclic shift calculation factor of a reference signal is shown in Table 2.

In the embodiment of the present application, a minimum distance between random two cyclic shift calculation factors corresponding to different sequence indexes is 2, which can guarantee orthogonality between reference signal sequences of different users, so as to further reduce interference between different users.

Optionally, as another embodiment, in step 240, if the UCI includes periodic CSI and HARQ-ACK, the base station may acquire a resource occupied by the periodic CSI, and acquire a resource occupied by the HARQ-ACK. The base station may decode the periodic CSI according to the resource occupied by the periodic CSI, and decode the HARQ-ACK according to the resource occupied by the HARQ-ACK. For example, the base station may receive, through the decoding of the periodic CSI, the periodic CSI transmitted on the PUCCH by the UE, and may receive, through the decoding of the HARQ-ACK, the HARQ-ACK transmitted on the PUCCH by the UE.

Optionally, as another embodiment, in step 240, the resource may be the number of encoded bits, the base station may acquire, according to the formula $Q_{ACK} = \lceil(O_{ACK}*24*\beta'_{offset})/(O_{CSI}+O_{ACK})\rceil*Q_m$, the number of encoded bits occupied by the HARQ-ACK, and acquire, according to the formula $Q_{CSI} = 48 - Q_{ACK}$, the number of encoded bits occupied by the periodic CSI, where $Q_{ACK}$ is the number of encoded bits occupied by the HARQ-ACK, $Q_{CSI}$ is the number of encoded bits occupied by the periodic CSI, $\beta'_{offset}$ is a value semi-statically configured for the UE by the base station through high-layer signaling or a preset value or a value dynamically specified for the UE by the base station, $O_{ACK}$ is the number of information bits of the HARQ-ACK, $O_{CSI}$ is the number of information bits of the periodic CSI, and $Q_m$ is a modulation order of the UCI. Alternatively, when the resource is the number of modulation symbols, the base station may acquire, according to the formula $Q'_{ACK} = \lceil(O_{ACK}*24*\beta'_{offset})/(O_{CSI}+O_{ACK})\rceil$, the number of modulation symbols occupied by the HARQ-ACK, and acquire, according to the formula $Q'_{CSI} = 24 - Q'_{ACK}$, the number of modulation symbols occupied by the CSI, where $Q'_{ACK}$ is the number of modulation symbols occupied by the HARQ-ACK, $Q'_{CSI}$ is the number of modulation symbols occupied by the periodic CSI, $\beta'_{offset}$ is a value semi-statically configured for the UE by the base station through high-layer signaling or a preset value or a value dynamically specified for the UE by the base station, $O_{ACK}$ is the number of information bits of the HARQ-ACK, $O_{CSI}$ is the number of information bits of the periodic CSI, and $Q_m$ is a modulation order of the UCI.

Optionally, as another embodiment, the base station may separate, according to the resource occupied by the periodic CSI and a manner in which the UE acquires the encoded bit sequence of the UCI, modulation symbols corresponding to the periodic CSI on the PUCCH, and separate, according to the resource occupied by the HARQ-ACK and the manner in which the UE acquires the encoded bit sequence of the UCI, modulation symbols corresponding to the HARQ-ACK on the PUCCH. The base station can decode, according to the modulation symbols corresponding to the periodic CSI, the periodic CSI, and decode, according to the modulation symbols corresponding to the HARQ-ACK, the HARQ-ACK.

Optionally, as another embodiment, in step 240, the base station may divide the encoded bit sequence of the periodic CSI into a first part of the encoded bit sequence of the periodic CSI and a second part of the encoded bit sequence of the periodic CSI, and divide the encoded bit sequence of the HARQ-ACK into a first part of the encoded bit sequence of the HARQ-ACK and a second part of the encoded bit sequence of the HARQ-ACK. The base station may collect the first part of the encoded bit sequence of the periodic CSI, the second part of the encoded bit sequence of the periodic CSI, the first part of the encoded bit sequence of the HARQ-ACK, and the second part of the encoded bit sequence of the HARQ-ACK in preset order, so as to obtain an encoded bit sequence of the UCI, where the preset order is: the first part of the encoded bit sequence of the HARQ-ACK, the first part of the encoded bit sequence of periodic the CSI, the second part of the encoded bit sequence of the HARQ-ACK, and the second part of the encoded bit sequence of the periodic CSI.

Currently, when periodic CSI and HARQ-ACK are transmitted on a physical uplink control channel at the same time, problems of how to properly allocate resources and how to map the periodic CSI and the HARQ-ACK on time and frequency resources also need to be solved, so as to better guarantee transmission performance of the periodic CSI and the HARQ-ACK. In the embodiment of the present application, the periodic CSI and the HARQ-ACK are both distributed on the time and frequency resources of two slots of the PUCCH, and therefore better time and frequency diversity gains can be obtained for both the periodic CSI and the HARQ-ACK, so as to guarantee the transmission performance of the periodic CSI and the HARQ-ACK.

The following further describes the embodiment of the present application in detail by using specific examples.

Figure 3:
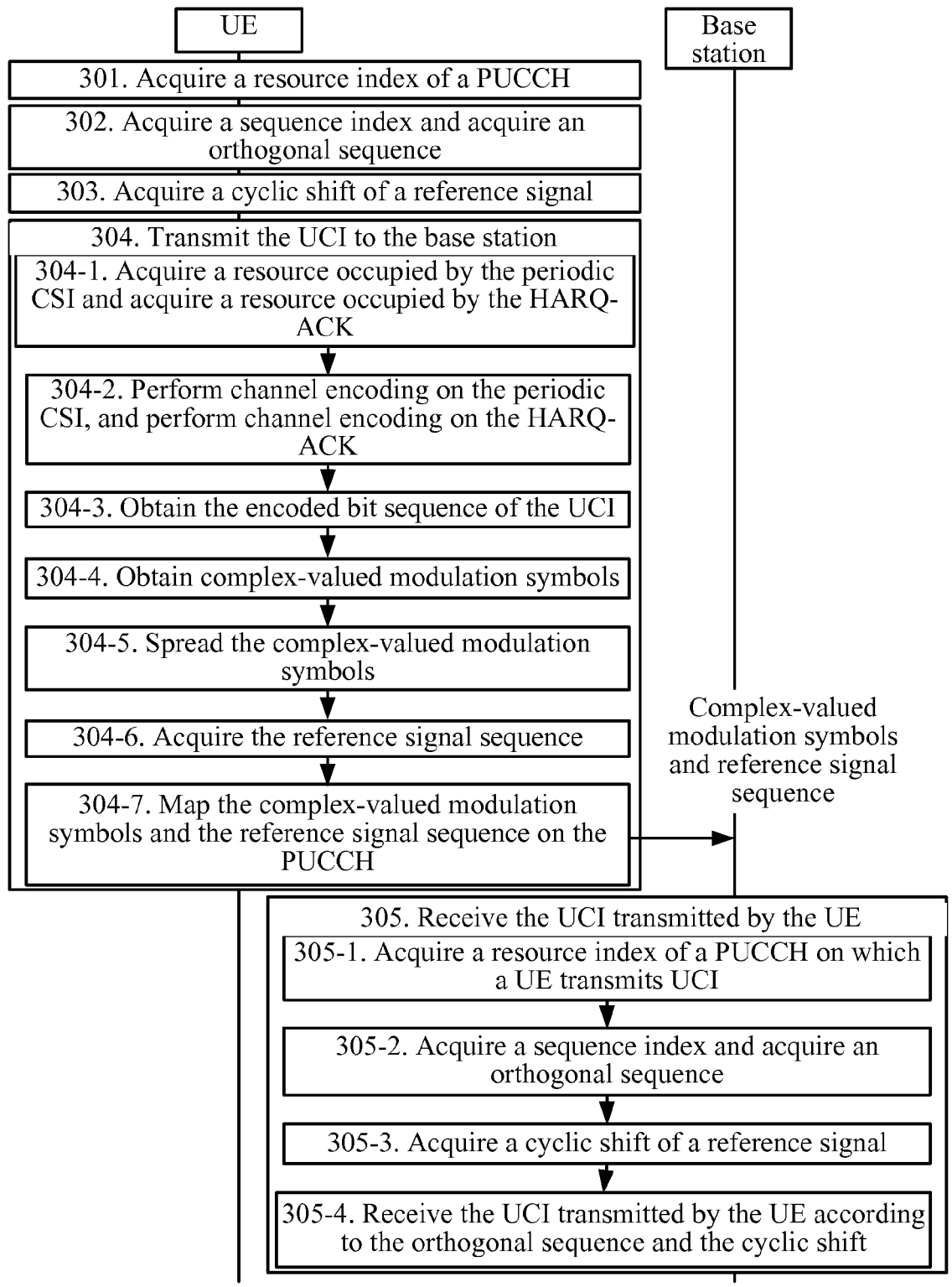
FIG. 3 is a schematic flow chart of a process of transmitting control information according to an embodiment of the present application.

FIG. 3 is a schematic flow chart of a process of transmitting control information according to an embodiment of the present application.

Step 301. A UE acquires a resource index of a PUCCH.

Optionally, the PUCCH is used for transmitting UCI. The PUCCH may be sent in PUCCH format 3, that is, the PUCCH can be in PUCCH format 3.

Optionally, the UE may acquire, according to signaling semi-statically notified by a high-layer, a resource index of a PUCCH, and may also acquire, according to signaling dynamically notified by the base station, a resource index of a PUCCH. That is, a PUCCH used for transmitting UCI may be reserved semi-statically, and may also be semi-statically reserved and dynamically indicated. Preferably, the UE may acquire, according to signaling semi-statically notified by a high-layer, a PUCCH resource reserved by the PUCCH and used for transmitting periodic CSI.

According to a resource index of a PUCCH, relevant resources of the PUCCH may be obtained. For example, when the PUCCH is in PUCCH format 3, according to the resource index of PUCCH, information such as the location of a PRB (physical resource block) of the PUCCH, an orthogonal sequence of the PUCCH, and a cyclic shift of a reference signal of the PUCCH may be obtained.

It should be understood that the UCI may include periodic CSI and HARQ-ACK, and may also include periodic CSI, HARQ-ACK and an SR, and may further include periodic CSI only, which is not limited in the embodiment of the present application.

Step 302. The UE acquires, according to the resource index in step 301, a sequence index of an orthogonal sequence of the PUCCH, and acquires the orthogonal sequence according to the sequence index.

Optionally, the orthogonal sequence may be used for spreading (block-wise spread) a complex-valued modulation symbol corresponding to the UCI. The sequence index may include a sequence index of an orthogonal sequence of a first slot and a sequence index of an orthogonal sequence of a second slot of the PUCCH, so that the sequence index of the orthogonal sequence of the first slot and the sequence index of the orthogonal sequence of the second slot of the PUCCH may be acquired according to the resource index of the PUCCH obtained in step 301, and then the orthogonal sequence of the first slot and the orthogonal sequence of the second slot of the PUCCH may be obtained according to the sequence index of the orthogonal sequence of the first slot and the sequence index of the orthogonal sequence of the second slot, respectively.

Optionally, when the PUCCH is in PUCCH format 3, step 302 may be implemented according to the following method, which is not limited in the embodiment of the present application.

Step 302-1. The UE may acquire, according to the resource index $n_{PUCCH}^{(3,\tilde{p})}$ of a PUCCH, the sequence index $n_{oc,0}^{(\tilde{p})}$ of the orthogonal sequence of the first slot and the sequence index $n_{oc,1}^{(\tilde{p})}$ of the orthogonal sequence of the second slot, which can be specifically obtained according to the following formulas:

$$n_{oc,0}^{(\tilde{p})} = n_{PUCH}^{(3,\tilde{p})} \bmod N_{SF,1}^{PUCCH}$$

$$n_{oc,1}^{(\tilde{p})} = \begin{cases} (3n_{oc,0}^{(\tilde{p})}) \bmod N_{SF,1}^{PUCCH}, & \text{when } N_{SF,1}^{PUCCH} = 5 \\ n_{oc,0}^{(\tilde{p})} \bmod N_{SF,1}^{PUCCH}, & \text{otherwise} \end{cases}$$

$N_{SF,1}^{PUCCH}$ is a spreading coefficient of a second slot of a PUCCH in PUCCH format 3, or $N_{SF,1}^{PUCCH}$ is a spreading coefficient of a second slot of a subframe in PUCCH format 3. In addition, PUCCH format 3 here may be normal PUCCH format 3 or shortened PUCCH format 3.

Step 302-2. The UE obtains, according to the sequence index of the orthogonal sequence of the first slot and the sequence index of the orthogonal sequence of the second slot, the orthogonal sequence $w_{n_{oc,0}^{(\tilde{p})}}(i)$ of the first slot and the orthogonal sequence $w_{n_{oc,1}^{(\tilde{p})}}(i)$ of the second slot of the PUCCH.

Optionally, the UE may acquire an orthogonal sequence from a sequence index according to Table 3.

TABLE 3

| | The orthogonal sequence $w_{n_{oc}}(i)$ | |
|---|---|---|
| Sequence index $n_{oc}$ | Orthogonal sequence $[w_{n_{oc}}(0) \cdots w_{n_{oc}}(N_{SF}^{PUCCH} - 1)]$ | |
| | $N_{SF}^{PUCCH} = 5$ | $N_{SF}^{PUCCH} = 4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |
| 4 | [1 $e^{j8\pi/5}$ $e^{j6\pi/5}$ $e^{j4\pi/5}$ $e^{j2\pi/5}$] | — |

Step 303. The UE acquires, according to the sequence index acquired in step 302, the cyclic shift of the reference signal of the PUCCH.

Optionally, when the sequence index acquired in step 302 includes the sequence index of the orthogonal sequence of the first slot and the sequence index of the orthogonal sequence of the second slot, the UE in step 303 may acquire a cyclic shift of a reference signal of the first slot and a cyclic shift of a reference signal of the second slot of the PUCCH according to the sequence index of the orthogonal sequence of the first slot and the sequence index of the orthogonal sequence of the second slot, respectively.

Optionally, step 303 may be implemented in either of the following two manners, which is not limited in the embodiment of the present application.

Manner 1: Acquire a cyclic shift of a reference signal of the PUCCH according to the sequence index.

In Manner 1, one sequence index may correspond to one cyclic shift. Here, as for one sequence index corresponds to one cyclic shift, it may refer to that: for one given reference signal symbol, that is, a pilot symbol, or for one given time domain SC-FDMA symbol used for transmitting a reference signal, one sequence index corresponds to one cyclic shift, that is to say, only one cyclic shift used for the pilot symbol can be obtained from one sequence index.

For example, when the PUCCH is in PUCCH format 3, the UE may acquire the cyclic shift $\alpha_{\tilde{p}}(n_s,l)$ through the following formulas:

$$\alpha_{\tilde{p}}(n_s,l) = 2\pi \cdot n_{cs}^{(\tilde{p})}(n_s,l)/N_{sc}^{RB}$$

$$n_{cs}^{(\tilde{p})}(n_s,l) = (n_{cs}^{cell}(n_s,l) + n'_{\tilde{p}}(n_s)) \bmod N_{sc}^{RB}$$

where $n_s$ is the slot number; $\tilde{p}$ is an antenna port index; l is a reference signal symbol index, for PUCCH format 3, in a normal cyclic prefix, the value of l is 1 and 5, and in an extended cyclic prefix, the value of l is 3; $N_{sc}^{RB}$ is the number of subcarriers included in one RB (resource block), whose value is 12; $n_{cs}^{cell}(n_s,l)$ is a cell-specific cyclic shift; $n'_{\tilde{p}}(n_s)$ may be referred to as a cyclic shift calculation factor and may be obtained from a sequence index according to Table 4, where $n_{oc}^{(\tilde{p})}$ can be $n_{oc,0}^{(\tilde{p})}$ and $n_{oc,1}^{(\tilde{p})}$, $n'_{\tilde{p}}(n_s)$ of the first slot is obtained from $n_{oc,0}^{(\tilde{p})}$, $n'_{\tilde{p}}(n_s)$ of the second slot is obtained from $n_{oc,1}^{(\tilde{p})}$; $N_{SF,1}$ is a spreading coefficient of a second slot, and usually $N_{SF,1}=5$, which is the spreading coefficient of the second slot in normal PUCCH format 3, and $N_{SF,1}=4$, which is the spreading coefficient of the second slot in shortened PUCCH format 3.

TABLE 4

Correspondence between a sequence index and a cyclic shift calculation factor

| | $n'_{\tilde{p}}(n_s)$ | |
|---|---|---|
| $n_{oc}^{(\tilde{p})}$ | $N_{SF, 1} = 5$ | $N_{SF, 1} = 4$ |
| 0 | 0 | 0 |
| 1 | 3 | 3 |
| 2 | 6 | 6 |
| 3 | 8 | 9 |
| 4 | 10 | N/A |

In Table 4, $n_{oc}^{(\tilde{p})}$ is the sequence index, $n'_{\tilde{p}}(n_s)$ is the cyclic shift calculation factor, $N_{SF,1}$ is the spreading coefficient of a second slot of the PUCCH, and N/A indicates not applicable.

Specifically, in Manner 1, one sequence index corresponds to one cyclic shift calculation factor $n'_{\tilde{p}}(n_s)$, and the UE may acquire, according to the cyclic shift calculation factor $n'_{\tilde{p}}(n_s)$, according to a cyclic shift calculation formula, the cyclic shift of the reference signal.

Manner 2: The cyclic shift of the reference signal of the PUCCH is acquired according to the sequence index and UCI.

In Manner 2, the cyclic shift of the reference signal of the PUCCH is acquired according to the sequence obtained in index step 302 and the UCI to be transmitted.

In this case, one sequence index may correspond to two cyclic shifts. Here, as for one sequence index corresponds to two cyclic shifts, it may refer to that: for one given reference signal symbol, that is, a pilot symbol, or for one given time domain SC-FDMA symbol used for transmitting a reference signal, one sequence index corresponds to two cyclic shifts, that is to say, two cyclic shifts used for the pilot symbol may be obtained from one sequence index.

One sequence index corresponds to two cyclic shifts, two cyclic shifts include a first cyclic shift and a second cyclic shift, and the UE may decide, according to the UCI, the cyclic shift to use. Optionally, if the UCI only includes periodic CSI, the cyclic shift of the reference signal is the first cyclic shift; if the UCI includes periodic CSI and HARQ-ACK, the cyclic shift of the reference signal is the second cyclic shift; and if the UCI includes periodic CSI, HARQ-ACK and an SR, the cyclic shift of the reference signal is the second cyclic shift.

For example, when the PUCCH is in PUCCH format 3, the step may be implemented in either of the following two implementation methods. In the two implementation methods, the cyclic shift $\alpha_{\tilde{p}}(n_s,l)$ of the reference signal may be acquired by adopting the following cyclic shift calculation formulas:

$$\alpha_{\tilde{p}}(n_s,l) = 2\pi \cdot n_{cs}^{(\tilde{p})}(n_s,l)/N_{sc}^{RB}$$

$$n_{cs}^{(\tilde{p})}(n_s,l) = (n_{cs}^{cell}(n_s,l) + n'_{\tilde{p}}(n_s)(n_s)) \bmod N_{sc}^{RB}$$

where $n_s$ is the slot number; $\tilde{p}$ is an antenna port index; l is a reference signal symbol index, and for PUCCH format 3, in a normal cyclic prefix, the value of l is 1 and 5, and in an extended cyclic prefix, the value of l is 3; $N_{sc}^{RB}$ is the number of subcarriers included in one RB, whose value is 12; $n_{sc}^{cell}(n_s,l)$ is a cell-specific cyclic shift; and $n'_p(n_s)$ is a cyclic shift calculation factor.

Implementation Method 1:

Step 303-a-1. Determine a cyclic shift calculation factor of the reference signal of the PUCCH according to the sequence index and the UCI.

In this step, the cyclic shift calculation factor of the reference signal of the PUCCH is determined according to the sequence index obtained in step 302 and the UCI to be transmitted. If the UCI only includes periodic CSI, it is determined that a cyclic shift calculation factor of the reference signal of the PUCCH is a first cyclic shift calculation factor corresponding to the sequence index, and if the UCI includes periodic CSI and HARQ-ACK or the UCI includes periodic CSI, HARQ-ACK and an SR, it is determined that the cyclic shift calculation factor of the reference signal of the PUCCH is a second cyclic shift calculation factor corresponding to the sequence index. The first cyclic shift calculation factor corresponding to the sequence index or the second cyclic shift calculation factor corresponding to the sequence index may be acquired according to correspondence between a sequence index and a cyclic shift calculation factor of a reference signal. For example, the correspondence between a sequence index and a cyclic shift calculation factor of a reference signal is shown in Table 1. It can be seen from Table 1 that, at a given spreading coefficient, each sequence index corresponds to two $n'_p(n_s)$, one of which may be referred to as first $n'_p(n_s)$, and the other may be referred to as second $n'_p(n_s)$. For example, when $n_{oc}^{(\tilde{p})}$ is 0, if $N_{SF,1}=5$, the sequence index 0 corresponds to two $n'_p(n_s)$, 0 and 1, 0 may be referred to as first $n'_p(n_s)$, and 1 may be referred to as second $n'_p(n_s)$. In this case, in this step, $n'_p(n_s)$ corresponding to a reference signal may be determined in first $n'_p(n_s)$ and second $n'_p(n_s)$ according to the UCI to be transmitted. Optionally, if the UCI only includes periodic CSI, $n'_p(n_s)$ corresponding to the reference signal is first $n'_p(n_s)$; if the UCI includes periodic CSI and HARQ-ACK, $n'_p(n_s)$ corresponding to the reference signal is second $n'_p(n_s)$; and if UCI includes periodic CSI, HARQ-ACK and an SR, $n'_p(n_s)$ corresponding to the reference signal is second $n'_p(n_s)$.

Step 303-a-2. Acquire, according to the determined cyclic shift calculation factor, the cyclic shift of the reference signal.

In this step, the user equipment may acquire, according to the determined $n'_p(n_s)$, the cyclic shift of the reference signal. Specifically, the cyclic shift of the reference signal may be acquired from the determined $n'_p(n_s)$ according to a cyclic shift calculation formula.

Implementation Method 2:

Step 303-b-1. Acquire two cyclic shift calculation factors corresponding to a sequence index.

In this step, two cyclic shift calculation factors corresponding to the sequence index obtained in step 302 are acquired according to correspondence between a sequence index and a cyclic shift calculation factor of a reference signal, which include a first cyclic shift calculation factor and a second cyclic shift calculation factor corresponding to the sequence index. For example, the correspondence between a sequence index and a cyclic shift calculation factor of a reference signal is shown in Table 1. It can be seen from Table 1 that, at a given spreading coefficient, each sequence index corresponds to two $n'_p(n_s)$, one of which may be referred to as first $n'_p(n_s)$, and the other can be referred to as second $n'_p(n_s)$. For example, when $n_{oc}^{\tilde{p}}$ is 0, if $N_{SF,1}=5$, the sequence index 0 corresponds to two $n'_p(n_s)$, 0 and 1, 0 may be referred to as first $n_p'(n_s)$, and 1 may be referred to as second $n'_p(n_s)$.

Step 303-b-2. Acquire, according to the two cyclic shift calculation factors obtained in step 303-b-1, two cyclic shifts, and determine, according to the UCI, in the two cyclic shifts, the cyclic shift of the reference signal of the PUCCH.

Specifically, a first cyclic shift and a second cyclic shift can be first obtained, according to a cyclic shift calculation formula, from first $n'_p(n_s)$ and second $n'_p(n_s)$ obtained in step 303-b-1, respectively; and next, the cyclic shift of the reference signal of the PUCCH is determined according to the UCI to be transmitted. Optionally, if the UCI only includes periodic CSI, the cyclic shift of the reference signal is the first cyclic shift; if the UCI includes periodic CSI and HARQ-ACK, the cyclic shift of the reference signal is the second cyclic shift; and if the UCI includes periodic CSI, HARQ-ACK and an SR, the cyclic shift of the reference signal is the second cyclic shift.

It should be noted that, in the two implementation methods, $n_{oc}^{(\tilde{p})}$ may be $n_{oc,0}^{(\tilde{p})}$ and $n_{oc,1}^{(\tilde{p})}$, and the cyclic shift of the reference signal of the first slot of the PUCCH may be obtained from $n_{oc,0}^{(\tilde{p})}$ and the UCI according to the foregoing method, and the cyclic shift of the reference signal of the second slot of the PUCCH may be obtained from $n_{oc,1}^{(\tilde{p})}$ and the UCI according to the foregoing method.

Optionally, in this step, the correspondence between a sequence index and a cyclic shift calculation factor of a reference signal may further be any one of Table 5 to Table 9, that is, in this step, $n'_p(n_s)$ corresponding to the sequence index may be acquired according to any one of Table 1, Table 2, and Table 5 to Table 9.

TABLE 5

Correspondence between a sequence index and a cyclic shift calculation factor

| | $n'_p(n_s)$ | |
|---|---|---|
| $n_{oc}^{(\tilde{p})}$ | $N_{SF,1} = 5$ | $N_{SF,1} = 4$ |
| 0 | 0/2 | 0/2 |
| 1 | 3/5 | 3/5 |
| 2 | 6/7 | 6/8 |
| 3 | 8/9 | 9/11 |
| 4 | 10/11 | N/A |

TABLE 6

Correspondence between a sequence index and a cyclic shift calculation factor

| | $n'_p(n_s)$ | |
|---|---|---|
| $n_{oc}^{(\tilde{p})}$ | $N_{SF,1} = 5$ | $N_{SF,1} = 4$ |
| 0 | 0/2 | 0/2 |
| 1 | 3/5 | 3/5 |
| 2 | 6/8 | 6/8 |
| 3 | 9/11 | 9/11 |
| 4 | N/A | N/A |

TABLE 7

Correspondence between a sequence index and a cyclic shift calculation factor

| | $n'_p(n_s)$ | |
|---|---|---|
| $n_{oc}^{(\tilde{p})}$ | $N_{SF,1} = 5$ | $N_{SF,1} = 4$ |
| 0 | 0/5 | 0/5 |
| 1 | 3/9 | 3/9 |
| 2 | 6/11 | 6/11 |
| 3 | 8/2 | 9/2 |
| 4 | 10/4 | N/A |

TABLE 8

Correspondence between a sequence index and a cyclic shift calculation factor

| | $n'_p(n_s)$ | |
|---|---|---|
| $n_{oc}^{(\tilde{p})}$ | $N_{SF,1} = 5$ | $N_{SF,1} = 4$ |
| 0 | 0/7 | 0/7 |
| 1 | 3/9 | 3/9 |
| 2 | 6/1 | 6/1 |
| 3 | 8/4 | 9/4 |
| 4 | 10/5 | N/A |

TABLE 9

Correspondence between a sequence index and a cyclic shift calculation factor

| | $n'_p(n_s)$ | |
|---|---|---|
| $n_{oc}^{(\tilde{p})}$ | $N_{SF,1} = 5$ | $N_{SF,1} = 4$ |
| 0 | 0/5 | 0/5 |
| 1 | 3/8 | 3/8 |
| 2 | 6/11 | 6/11 |
| 3 | 8/1 | 9/4 |
| 4 | 10/4 | N/A |

In Table 5 to Table 9, $n_{oc}^{(\tilde{p})}$ is the sequence index, $n'_p(n_s)$ is a cyclic shift calculation factor, $N_{SF,1}$ is the spreading coefficient of a second slot of the PUCCH, and N/A indicates not applicable. Optionally, $n_{oc}^{(\tilde{p})}$ may be $n_{oc,0}^{(\tilde{p})}$ and $n_{oc,1}^{(\tilde{p})}$, the cyclic shift of the reference signal of the first slot may be obtained from $n_{oc,0}^{(\tilde{p})}$ and the UCI according to the foregoing method, and the cyclic shift of the reference signal of the second slot may be obtained from $n_{oc,1}^{(\tilde{p})}$ and the uplink control information according to the foregoing method.

It should be noted that, in Table 1, Table 2, and Table 5 to Table 9, "/" may indicate "or". Also, any one of Table 1, Table 2, and Table 5 to Table 9 may be divided into two tables. For example, the first table may only include a first cyclic shift calculation factor only, the second table may include a second cyclic shift calculation factor only, and in this case, the method for acquiring the value of $n'_p(n_s)$ according to the sequence index and the UCI may be implemented in the following manner:

If the UCI only includes periodic CSI, the cyclic shift calculation factor $n'_p(n_s)$ may be acquired according to the sequence index and the first table, or the cyclic shift calculation factor $n'_p(n_s)$ may be acquired from the first table according to the sequence index. If the UCI includes periodic CSI and HARQ-ACK or the UCI includes periodic CSI, HARQ-ACK and an SR, the cyclic shift calculation factor $n'_p(n_s)$ may be acquired according to the sequence index and the second table or the cyclic shift calculation factor $n'_p(n_s)$ may be acquired from the second table according to the sequence index.

For example, Table 1 may be divided into Table 10 and Table 11. In this case, the method for acquiring the value of $n'_p(n_s)$ according to the sequence index and the UCI may be implemented in the following manner:

If the UCI only includes periodic CSI, the cyclic shift calculation factor $n'_p(n_s)$ may be acquired according to the sequence index and Table 10; and if the UCI includes periodic CSI and HARQ-ACK or the UCI includes periodic CSI, HARQ-ACK and an SR, the cyclic shift calculation factor $n'_p(n_s)$ may be acquired according to the sequence index and Table 11.

TABLE 10

| | $n'_{\tilde{p}}(n_s)$ | |
|---|---|---|
| $n_{oc}^{(\tilde{p})}$ | $N_{SF,1} = 5$ | $N_{SF,1} = 4$ |
| 0 | 0 | 0 |
| 1 | 3 | 3 |
| 2 | 6 | 6 |
| 3 | 8 | 9 |
| 4 | 10 | N/A |

TABLE 11

| | $n'_{\tilde{p}}(n_s)$ | |
|---|---|---|
| $n_{oc}^{(\tilde{p})}$ | $N_{SF,1} = 5$ | $N_{SF,1} = 4$ |
| 0 | 1 | 1 |
| 1 | 4 | 4 |
| 2 | 7 | 7 |
| 3 | 9 | 10 |
| 4 | 11 | N/A |

It should be noted that, except boxes filled in with "N/A" in Table 1, Table 2, and Table 5 to Table 9, in the rest boxes, "/" may also be replaced by "," indicating "or". For example, Table 1 may be replaced by Table 12.

TABLE 12

| | $n'_{\tilde{p}}(n_s)$ | |
|---|---|---|
| $n_{oc}^{(\tilde{p})}$ | $N_{SF,1} = 5$ | $N_{SF,1} = 4$ |
| 0 | 0, 1 | 0, 1 |
| 1 | 3, 4 | 3, 4 |
| 2 | 6, 7 | 6, 7 |
| 3 | 8, 9 | 9, 10 |
| 4 | 10, 11 | N/A |

A reference signal sequence is obtained from one base sequence and one cyclic shift. A plurality of reference signal sequences may be generated from one base sequence through different cyclic shifts. According to characteristics of the reference signal sequence, a reference signal sequence of the length 12 may correspond to 12 cyclic shifts, and when a distance between cyclic shifts of two reference signal sequences is larger, it indicates that the two reference signal sequences have better orthogonality.

In Table 1, the correspondence between a sequence index and a cyclic shift calculation factor meets that: adjacent are $n'_p(n_s)$ are allocated to two $n'_p(n_s)$ corresponding to one sequence index, and a distance between $n'_p(n_s)$ corresponding to different sequence indexes is greater than or equal to a distance between two $n'_p(n_s)$ corresponding to a same sequence index. An advantage of such a design is that interference between different users is minimized. In one aspect, two cyclic shifts corresponding to one sequence index are applied to different scenarios, for example, one is used for a case of sending periodic CSI only, and the other is used for a case of sending periodic CSI and HARQ-ACK at the same time. For one PUCCH resource, the sending on each uplink subframe corresponds to either of the cases, that is, mutual interference does not occur during the decoding of the UCI. In another aspect, different users are multiplexed on one PRB, different users use different reference signal sequences, different reference signal sequences are orthogonal through cyclic shifts, that is, different users use different cyclic shifts for the reference signal. Therefore, mutual interference between different users occurs during the decoding of uplink control information.

Optionally, the number of users multiplexed on one PRB may be reduced. That is, if a high-layer configures that a UE transmits periodic CSI and HARQ-ACK at the same time by adopting PUCCH format 3, the number of users multiplexed on one PRB is reduced. For example, the number of users multiplexed on one PRB is reduced to 4, and in this case, Table 1 can be replaced by Table 2. It can be seen from Table 2 that, a minimum distance between random two $n'_p(n_s)$ corresponding to different sequence indexes is 2, which can guarantee orthogonality between reference signal sequences of different users, so as to further reduce interference between different users.

Design principles in Table 1 and Table 2 are both to maximize a maximum distance between cyclic shifts of reference signal sequences, aiming to reduce interference between users. The design principles in Table 5 to Table 9 are all to maximize a distance between the cyclic shifts of reference signal sequences of one user in two cases, so that the base station better distinguishes a case of transmission of periodic CSI only from a case of simultaneous transmission of periodic CSI and HARQ-ACK.

Step 304. The UE transmits the UCI to the base station on the PUCCH according to the orthogonal sequence acquired in step 302 and the cyclic shift of the reference signal acquired in step 303.

If the PUCCH is in PUCCH format 3, the UE may transmit, according to the orthogonal sequence of the first slot and the orthogonal sequence of the second slot acquired in step 302, according to the cyclic shift of the reference signal acquired in step 303, and on the PRB indicated by the resource index of the PUCCH acquired in step 301, the UCI to the base station. Specifically, the UE may perform block-wise spreading on complex-valued modulation symbols corresponding to the UCI by adopting the orthogonal sequence, generate reference signal sequences through cyclic shifts, and perform transmission to the base station by adopting a corresponding PUCCH format, for example, PUCCH format 3. A method of performing block-wise spreading on complex-valued modulation symbols corresponding to uplink control information by adopting an orthogonal sequence and the method of generating a reference signal sequence through a cyclic shift may be referred to the prior art, which are not repeatedly described herein.

Optionally, when the UCI to be transmitted includes periodic CSI and HARQ-ACK, step 304 may be further implemented through the following step. It should be noted that, in the embodiment of the present application, the method described in this step can also be applied to the case when the UCI to be transmitted includes periodic CSI, HARQ-ACK and an SR, and in this case the HARQ-ACK in this step may be replaced by HARQ-ACK and an SR, that is, HARQ-ACK and an SR are considered as one whole and transmitted at the same time as the periodic CSI, or it may be considered that the information bit of the HARQ-ACK and 1 bit of the SR bit are serially connected and then transmitted at the same time as the periodic CSI. For example, the acquiring the resource occupied by the HARQ-ACK in step 304-1 may be changed to the acquiring of resources occupied by HARQ-ACK and an SR, or it may be considered that the "HARQ-ACK" described in this step may be replaced by the "HARQ-ACK and SR".

Step 304-1. The UE acquires a resource occupied by the periodic CSI and acquire a resource occupied by the HARQ-ACK.

Optionally, the resource can be the number of modulation symbols or encoded bits, that is, the UE may acquire the number of modulation symbols occupied by the periodic CSI and the number of modulation symbols occupied by the HARQ-ACK, or the UE may acquire the number of encoded bits occupied by the periodic CSI and the number of encoded bits occupied by the HARQ-ACK.

For example, when the PUCCH is in PUCCH format 3 and the resource is the number of encoded bits, the UE may acquire, according to the following formula, the number of encoded bits occupied by the periodic CSI and the number of encoded bits occupied by the HARQ-ACK.

$$Q_{ACK}[(O_{ACK}*24*\beta'_{offset})/(O_{CSI}+O_{ACK})]*Q_m$$

$$Q_{CSI}=48-Q_{ACK}$$

where $Q_{ACK}$ is the number of encoded bits of the HARQ-ACK; $Q_{CSI}$ is the number of encoded bits of the periodic CSI; $\beta'_{offset}$ is a value semi-statically configured for the UE by the base station through high-layer signaling or a preset value or a value dynamically specified for the UE by the base station, and if the reporting type of the periodic CSI is the reporting type 3, the reporting type 5 and the reporting type 6, $\beta'_{offset}=1$; $O_{ACK}$ is the total number of information bits of the HARQ-ACK to be transmitted; $O_{CSI}$ is the total number of information bits of the periodic CSI to be transmitted; and $Q_m$ is a modulation order of the UCI, for example, $Q_m=2$.

When the PUCCH is in PUCCH format 3 and the resource is the number of modulation symbols, the UE may acquire, according to the following formula, the number of modulation symbols occupied by the HARQ-ACK and the number of modulation symbols occupied by the CSI.

$$Q'_{ACK}=[(O_{ACK}*24*\beta'_{offset})/(O_{CSI}+O_{ACK})]$$

$$Q'_{CSI}=24-Q'_{ACK}$$

where $Q'_{ACK}$ is the number of modulation symbols of the HARQ-ACK, $Q'_{CSI}$ is the number of modulation symbols of the periodic CSI; $\beta'_{offset}$ is a value semi-statically configured for the UE by the base station through high-layer signaling or a preset value or a value dynamically specified for the UE by the base station, and if the reporting type of the periodic CSI is the reporting type 3, the reporting type 5 and the reporting type 6, $\beta'_{offset}=1$; $O_{ACK}$ is the number of information bits of the HARQ-ACK; $O_{CSI}$ is the number of information bits of the periodic CSI; and $Q_m$ is a modulation order of the UCI, for example, $Q_m=2$.

Step 304-2. The UE performs, according to the resource occupied by the periodic CSI, channel encoding on the periodic CSI to obtain an encoded bit sequence of the periodic CSI, and performs, according to the resource occupied by the HARQ-ACK, channel encoding on the HARQ-ACK to obtain an encoded bit sequence of the HARQ-ACK.

If the resource in step 304-1 is the number of modulation symbols, the number of encoded bits occupied by the periodic CSI and the number of encoded bits occupied by the HARQ-ACK may be calculated according to the number of modulation symbols occupied by the periodic CSI and the number of modulation symbols occupied by the HARQ-ACK, respectively. Specifically, the number of modulation symbols may be multiplied by the modulation order of the UCI to obtain the corresponding number of encoded bits, and then channel encoding is performed according to the number of encoded bits of the periodic CSI and the number of encoded bits of the HARQ-ACK, so as to obtain the encoded bit sequence $q_0^{CSI}, q_1^{CSI}, q_2^{CSI}, \ldots, q_{Q_{CSI}-1}^{CSI}$ of the periodic CSI and the encoded bit sequence $q_0^{ACK}, q_1^{ACK}, q_2^{ACK}, \ldots, q_{Q_{ACK}-1}^{ACK}$ of the HARQ-ACK.

If the resource in step 304-1 is the number of encoded bits, in this step, channel encoding may be directly performed on the periodic CSI according to the number of encoded bits of the periodic CSI acquired in step 304-1, and channel encoding is performed on the HARQ-ACK according to the number of encoded bits of the HARQ-ACK acquired in step 304-1, so as to obtain the encoded bit sequence $q_0^{CSI}, q_1^{CSI}, q_2^{CSI}, \ldots, q_{Q_{CSI}-1}^{CSI}$ of the periodic CSI and the encoded bit sequence $q_0^{ACK}, q_1^{ACK}, q_2^{ACK}, \ldots, q_{Q_{ACK}-1}^{ACK}$ of the HARQ-ACK.

For example, the channel encoding method may be: independent channel encoding is performed on the periodic CSI and the HARQ-ACK. Specifically, when the total number of information bits of the periodic CSI to be transmitted is smaller than or equal to 11, the Reed-Muller (RM) (32, O) code is adopted to encode the periodic CSI. When the total number of information bits of the periodic CSI to be transmitted is greater than 11, the double Reed-Muller RM (32, O) code is adopted to encode the periodic CSI or the tail biting convolutional code (TBCC) is adopted to perform channel encoding on the periodic CSI. When the total number of information bits of the HARQ-ACK to be transmitted is smaller than or equal to 11, the Reed-Muller RM (32, O) code is adopted to encode the HARQ-ACK. When the total number of information bits of the HARQ-ACK to be transmitted is greater than 11, the double Reed-Muller RM (32, O) code is adopted to encode the HARQ-ACK or the TBCC is adopted to perform channel encoding on the HARQ-ACK.

Step 304-3. The UE collects encoded bits in the encoded bit sequence of the periodic CSI and encoded bits in the encoded bit sequence of the HARQ-ACK to obtain the encoded bit sequence of the UCI.

Step 304-3 may be implemented in the following two manners:

Manner 1: The encoded bits in the encoded bit sequence of the periodic CSI and the encoded bits in the encoded bit sequence of the HARQ-ACK are collected, so that the time and frequency resources occupied by the encoded bits of the HARQ-ACK extend upward from the bottom of the time and frequency resources of each slot, and the time and frequency resources occupied by the encoded bits of the periodic CSI extend downward from the top of the time and frequency resources of each slot.

Specifically, it is assumed that the encoded bit sequence of the periodic CSI is $q_0^{CSI}, q_1^{CSI}, q_2^{CSI}, \ldots, q_{Q_{CSI}-1}^{CSI}$ and the encoded bit sequence of the HARQ-ACK is $q_0^{ACK}, q_1^{ACK}, q_2^{ACK}, \ldots, q_{Q_{ACK}-1}^{ACK}$ it is obtained that the encoded bit sequence of the UCI is $b(0), \ldots, b(Q_{CSI}+Q_{ACK}-1)$, and in this manner, the step may be implemented by using the following method.

Implementation method of Manner 1: The encoded bit sequence of the periodic CSI is divided into a first part of the encoded bit sequence of the periodic CSI and a second part of the encoded bit sequence of the periodic CSI, the encoded bit sequence of the HARQ-ACK is divided into a first part of the encoded bit sequence of the HARQ-ACK and a second part of the encoded bit sequence of the HARQ-ACK, and parts of the encoded bit sequence are collected to obtain the encoded bit sequence of the uplink control information. Specifically, the collection method may be that: the first part of the encoded bit sequence of the HARQ-ACK is first collected, the first part of the encoded bit sequence of the periodic CSI is then collected, the second part of the encoded bit sequence of the HARQ-ACK is subsequently collected, and the second part of the encoded bit sequence of the periodic CSI is collected in the end.

The method may specifically be implemented in the following manner: the encoded bit sequence $q_0^{CSI}, q_1^{CSI}, q_2^{CSI}, \ldots, q_{Q_{CSI}-1}^{CSI}$ of the periodic CSI is divided into two parts:

$$q_0^{CSI}, q_1^{CSI}, q_2^{CSI}, \ldots, q_{\lceil 12-\lceil(Q_{ACK}/2)/2 \rceil\rceil *2-1}^{CSI}$$

and $$q_{\lceil 12-\lceil(Q_{ACK}/2)/2\rceil\rceil *2}^{CSI}, q_{\lceil 12-\lceil(Q_{ACK}/2)/2\rceil\rceil *2+1}^{CSI}, \ldots, q_{Q_{CSI}-1}^{CSI},$$

the encoded bit sequence $q_0^{ACK}, q_1^{ACK}, q_2^{ACK}, \ldots, q_{Q_{ACK}-1}^{ACK}$ of the HARQ-ACK is divided into two parts:

$$q_0^{ACK}, q_1^{ACK}, q_2^{ACK}, \ldots, q_{\lceil(Q_{ACK}/2)/2\rceil *2-1}^{ACK}$$

and $$q_{\lceil(Q_{ACK}/2)/2\rceil *2}^{ACK}, q_{\lceil(Q_{ACK}/2)/2\rceil *2+1}^{ACK}, \ldots, q_{Q_{ACK}-1}^{ACK},$$

and the parts of encoded bit sequence are collected to obtain the encoded bit sequence $b(0), \ldots, b(Q_{CSI}+Q_{ACK}-1)$ of the UCI. Specifically, the collection method may be that: the first part of the encoded bit sequence of the HARQ-ACK is first collected, the first part of the encoded bit sequence of the periodic CSI is then collected, the second part of the encoded bit sequence of the HARQ-ACK is subsequently collected, and the second part of the encoded bit sequence of the periodic CSI is collected in the end.

The method may specifically be further implemented through the following pseudo code:

```
Set i = 0
while i < ⌈(Q_ACK/2)/2⌉ * 2
    b(i) = q_i^ACK
    i = i + 1
end while
Set i = 0
while i < (12 - ⌈(Q_ACK/2)/2⌉) * 2
    b(i + ⌈(Q_ACK/2)/2⌉ * 2) = q_i^CSI
    i = i + 1
end while
Set i = 0
while i < (Q_ACK - ⌈(Q_ACK/2)/2⌉ * 2)
    b(i + 24) = q_{i+⌈(Q_ACK/2)/2⌉*2}^ACK
    i = i + 1
end while
Set i = 0
while i < (24 - Q_ACK + ⌈(Q_ACK/2)/2⌉ * 2)
    b(i + 24 + (Q_ACK - ⌈(Q_ACK/2)/2⌉ * 2)) = q_{i+(12-⌈(Q_ACK/2)/2⌉)*2}^CSI
    i = i + 1
end while
```

Figure 4:
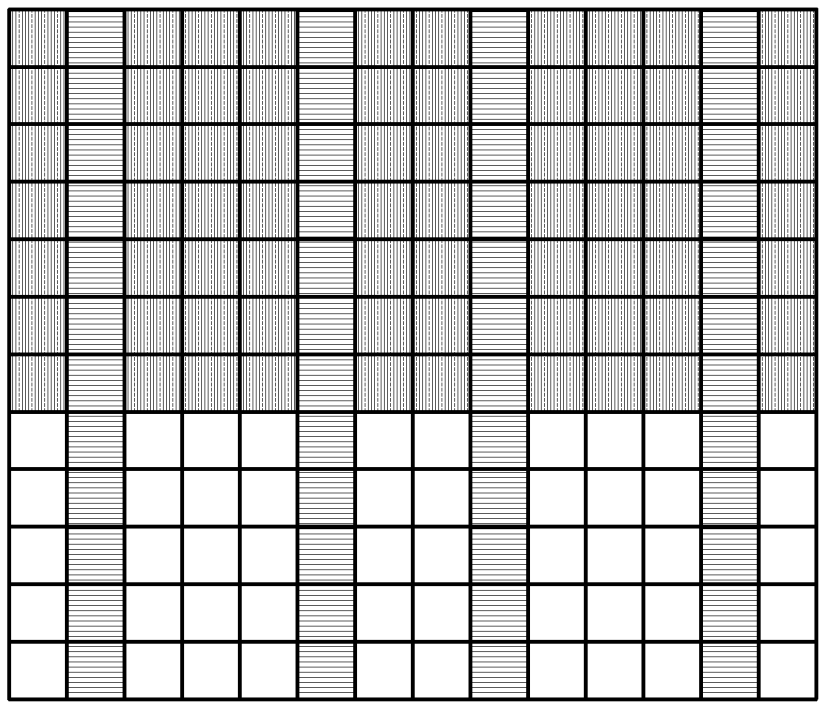
FIG. 4 is a schematic diagram of a resource mapping of UCI.

In this manner, the time and frequency resources occupied by the encoded bits of the HARQ-ACK and the encoded bits of the periodic CSI may be shown in FIG. 4.

Manner 2: The encoded bits in the encoded bit sequence of the periodic CSI and the encoded bits in the encoded bit sequence of the HARQ-ACK are collected, so that in the encoded bit sequence of the periodic CSI and the encoded bit sequence of the HARQ-ACK, the encoded bits included in the encoded bit sequence with fewer encoded bits are discretely distributed on the time and frequency resources.

Specifically, it is assumed that the encoded bit sequence of the periodic CSI is $q_0^{CSI}, q_1^{CSI}, q_2^{CSI}, \ldots, q_{Q_{CSI}-1}^{CSI}$ and the encoded bit sequence of the HARQ-ACK is $q_0^{ACK}, q_1^{ACK}, q_2^{ACK}, \ldots, q_{Q_{ACK}-1}^{ACK}$, it is obtained that the encoded bit sequence of the UCI is $b(0), \ldots, b(Q_{CSI}+Q_{ACK}-1)$, and the manner may be implemented by using the following method.

Implementation method of Manner 2: A first UCI encoded bit sequence and a second UCI encoded bit sequence are determined. The first UCI encoded bit sequence is divided into a first part of the first UCI encoded bit sequence and a second part of the first UCI encoded bit sequence. The second UCI encoded bit sequence is divided into a first part of the second UCI encoded bit sequence and a second part of the second UCI encoded bit sequence. By taking encoded bits of the number being $Q_m$ as a granularity, encoded bits are alternately selected from the first part of the first UCI encoded bit sequence and the first part of the second UCI encoded bit sequence, and encoded bits are first selected from the first part of the first UCI encoded bit sequence, so as to obtain the first part of the encoded bit sequence of the UCI. By taking encoded bits of the number being $Q_m$ as a granularity, encoded bits are alternately selected from the second part of the first UCI encoded bit sequence and the second part of the second UCI encoded bit sequence, and encoded bits are first selected from the second part of the first UCI encoded bit sequence, so as to obtain the second part of the encoded bit sequence of the UCI. The first part of the encoded bit sequence of the UCI and the second part of the encoded bit sequence of the UCI are serially connected to obtain the encoded bit sequence of the UCI. $Q_m$ is a modulation order of the UCI. For example, when PUCCH is in PUCCH format 3, $Q_m=2$.

Optionally, the number of bits of the first UCI encoded bit sequence is smaller than or equal to the number of encoded bits of the second UCI encoded bit sequence. The first UCI encoded bit sequence may be the encoded bit sequence of the periodic CSI, and may also be the encoded bit sequence of the HARQ-ACK. Optionally, if the number of encoded bits in the encoded bit sequence of the periodic CSI is smaller than the number of encoded bits in the encoded bit sequence of the HARQ-ACK, the first UCI encoded bit sequence is the encoded bit sequence of the periodic CSI. If the number of encoded bits in the encoded bit sequence of the periodic CSI is greater than the number of encoded bits in the encoded bit sequence of the HARQ-ACK, the first UCI encoded bit sequence is the encoded bit sequence of the HARQ-ACK. If the number of encoded bits in the encoded bit sequence of the periodic CSI is equal to the number of encoded bits in the encoded bit sequence of the HARQ-ACK, the first UCI encoded bit sequence is the encoded bit sequence of the HARQ-ACK or the encoded bit sequence of the periodic CSI, and preferably, the first UCI encoded bit sequence is the encoded bit sequence of the HARQ-ACK.

The following describes a specific implementation manner in detail by taking an example in which the first UCI encoded bit sequence is the encoded bit sequence of the HARQ-ACK and the second UCI encoded bit sequence is the encoded bit sequence of the periodic CSI.

The encoded bit sequence $q_0^{ACK}, q_1^{ACK}, q_2^{ACK}, \ldots, q_{Q_{ACK}-1}^{ACK}$ HARQ-ACK is divided into two parts:

$$q_0^{ACK}, q_1^{ACK}, q_2^{ACK}, \ldots, q_{\lceil (Q_{ACK}/2)/2 \rceil *2-1}^{ACK}$$

and $$q_{\lceil (Q_{ACK}/2)/2 \rceil *2}^{ACK}, q_{\lceil (Q_{ACK}/2)/2 \rceil *2+1}^{ACK}, \ldots, q_{Q_{ACK}-1}^{ACK}.$$

The encoded bit sequence $q_0^{CSI}, q_1^{CSI}, q_2^{CSI}, \ldots, q_{Q_{CSI}-1}^{CSI}$ of the periodic CSI is divided into two parts:

$$q_0^{CSI}, q_1^{CSI}, q_2^{CSI}, \ldots, q_{(12-\lceil (Q_{ACK}/2)/2 \rceil)*2-1}^{CSI}$$

and $$q_{(12-\lceil (Q_{ACK}/2)/2 \rceil)*2}^{CSI}, q_{(12-\lceil (Q_{ACK}/2)/2 \rceil)*2+1}^{CSI}, \ldots, q_{Q_{CSI}-1}^{CSI}.$$

By taking encoded bits of the number being $Q_m$ as a granularity, encoded bits are alternately selected from $$q_0^{ACK}, q_1^{ACK}, q_2^{ACK}, \ldots, q_{\lceil (Q_{ACK}/2)/2 \rceil *2-1}^{ACK}$$

and $$q_0^{CSI}, q_1^{CSI}, q_2^{CSI}, \ldots, q_{(12-\lceil (Q_{ACK}/2)/2 \rceil)*2-1}^{CSI},$$

and encoded bits are first selected from $$q_0^{ACK}, q_1^{ACK}, q_2^{ACK}, \ldots, q_{\lceil (Q_{ACK}/2)/2 \rceil *2-1}^{ACK},$$

so as to obtain a first part b(0), . . . , B(23) of the encoded bit sequence of the UCI. By taking encoded bits of the number being $Q_m$ as a granularity, encoded bits are alternately selected from $$q^{ACK}_{\lceil (Q_{ACK}/2)/2 \rceil *2}, q^{ACK}_{\lceil (Q_{ACK}/2)/2 \rceil *2+1}, \cdots, q^{ACK}_{Q_{ACK}-1}$$

and $$q^{CSI}_{(12-\lceil (Q_{ACK}/2)/2 \rceil)*2}, q^{CSI}_{(12-\lceil (Q_{ACK}/2)/2 \rceil)*2+1}, \cdots, q^{CSI}_{Q_{CSI}-1},$$

and encoded bits are first selected from $$q^{ACK}_{\lceil (Q_{ACK}/2)/2 \rceil *2}, q^{ACK}_{\lceil (Q_{ACK}/2)/2 \rceil *2+1}, \cdots, q^{ACK}_{Q_{ACK}-1},$$

so as to obtain a second part b(24), . . . , b(47) of the encoded bit sequence of the UCI. The first part b(0), . . . , b(23) of the encoded bit sequence of the UCI and the second part b(24), . . . , b(47) of the encoded bit sequence of the UCI are serially connected to obtain the encoded bit sequence B(0), b(1), . . . , b(47) of the UCI.

Figure 5:
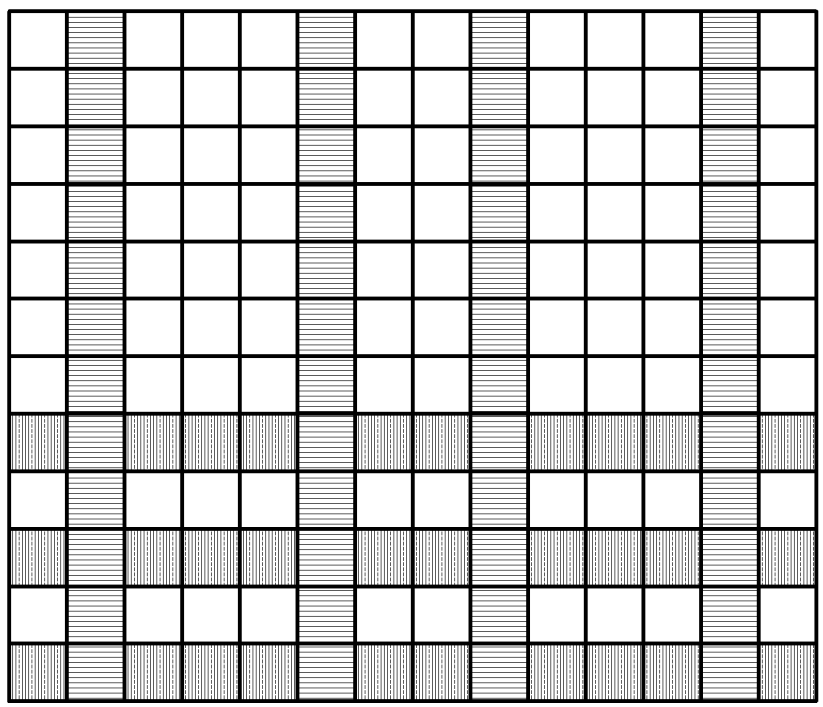
FIG. 5 is a schematic diagram of a resource mapping of UCI.

In this manner, the time and frequency resources occupied by the encoded bits of the HARQ-ACK and the encoded bits of the periodic CSI are shown in FIG. 5.

Step 304-4. The UE scrambles and modulates the encoded bits in the encoded bit sequence of the UCI to obtain a group of complex-valued modulation symbols.

For example, the encoded bit in the encoded bit sequence of the UCI may be scrambled first, and then the scrambled encoded bits are modulated, so as to obtain a group (or a block) of complex-valued modulation symbols. For example, when the PUCCH is in PUCCH format 3, the encoded bit in the encoded bit sequence b(0), b(1), . . . , b(47) of the UCI obtained in step 304-3 is scrambled first, and QPSK (Quadrature Phase Shift Keying) modulation is then performed on the scrambled encoded bits, so as to obtain 24 complex-valued modulation symbols.

Step 304-5. The UE spreads, by using the orthogonal sequence obtained in step 302, the group of complex-valued modulation symbols obtained in step 304-4, so as to obtain the spread complex-valued modulation symbols.

For example, when the PUCCH is in PUCCH format 3, the first 12 modulation symbols in the group of complex-valued symbols may be spread by using the orthogonal sequence of the first slot obtained in step 302, and the spread complex-valued symbols are mapped on the time and frequency resources of the first slot of the PUCCH. The last 12 modulation symbols in the group of complex-valued symbols are spread by using the orthogonal sequence of the second slot obtained in step 302, and the spread complex-valued symbols are mapped on the time and frequency resources of the second slot of the PUCCH.

Step 304-6. Acquire, according to the cyclic shift of the reference signal obtained in step 303, the reference signal sequence of the PUCCH.

For example, when the PUCCH is in PUCCH format 3, the reference signal sequence of the first slot of the PUCCH may be acquired by using the cyclic shift of the reference signal of the first slot obtained in step 303, and the reference signal sequence of the second slot of the PUCCH may be acquired by using the cyclic shift of the reference signal of the second slot obtained in step 303.

Step 304-7. The UE maps the complex-valued modulation symbols obtained in step 304-5 and the reference signal sequence obtained in step 304-6 on the PUCCH for transmission to the base station.

For example, the complex-valued modulation symbols obtained in step 304-5 are obtained by the UCI, and therefore the complex-valued modulation symbols obtained in step 304-5 are mapped to the PUCCH for transmission to the base station, so as to map the UCI on the PUCCH for transmission to the base station.

It should be understood that when the PUCCH is in PUCCH format 3, before the complex-valued modulation symbols are mapped on the time and frequency resources, the UE may further perform an operation such as a cyclic shift on the complex-valued modulation symbols first, which is not repeatedly described in detail herein. The embodiment of the present application does not limit a specific step of transmitting the UCI on the PUCCH to the base station according to the orthogonal sequence and the cyclic shift of the reference signal, and other additional steps may further be adopted.

Step 305. The base station receives the UCI transmitted by the user equipment UE.

In this step, the base station receives the UCI transmitted by the user equipment, so as to acquire the uplink control information UCI transmitted by the user equipment. The step may further include a part of or all of the following steps, and the present application preferably includes all the following steps:

Step 305-1. The base station acquires a resource index of a PUCCH on which a UE transmits UCI.

As a resource index of a PUCCH used by a UE is semi-statically configured by a base station or dynamically notified by a base station, the base station is capable of learning the resource index of the PUCCH on which the UE sends the UCI. For example, the base station may acquire, according to high-layer signaling semi-statically notified by the UE and used for indicating a resource index of a PUCCH or according to signaling dynamically notified by the UE and used for indicating a resource index of a PUCCH, a resource index of a PUCCH on which the UE sends UCI. In this step, the base station can further, through the resource index of the PUCCH, acquire information such as the location of the PRB of the PUCCH on which the user equipment transmits the UCI.

For other description of step 305-1, reference may be made to step 301, which is not repeatedly described herein.

Step 305-2. The base station acquires a sequence index of an orthogonal sequence of the PUCCH according to the resource index, and acquires the orthogonal sequence according to the sequence index.

Step 305-2 is similar to step 302, which is not repeatedly described herein.

Step 305-3. The base station acquires a cyclic shift of a reference signal of the PUCCH according to the sequence index.

Optionally, when step 303 is implemented according to Manner 1, in step 305-3, the base station may directly acquire, according to the sequence index obtained in step 305-2, the cyclic shift of the reference signal of the PUCCH for sending the UCI. Specifically, a implementation method for acquiring the cyclic shift of the reference signal from the sequence index is similar to Manner 1 in step 303, which is not repeatedly described herein.

Optionally, when step 303 is implemented according to Manner 2, step 305-3 can be implement through the following steps.

Step 305-3-1. The base station acquires, according to the sequence index obtained in step 305-2, a first cyclic shift and a second cyclic shift corresponding to the sequence index.

Optionally, the method for acquiring a first cyclic shift and a second cyclic shift corresponding to the sequence index from the sequence index may also be implemented through the following steps:

Step 305-3-1-a. The base station first acquires two $n'_p(n_s)$ corresponding to the sequence index.

Optionally, the base station may acquire, according to the correspondence between a sequence index and $n'_p(n_s)$ used in step a in step 303, two $n'_p(n_s)$ corresponding to the sequence index. For example, when the correspondence in Table 1 is adopted, the base station acquires, according to Table 1, two $n'_p(n_s)$ corresponding to the sequence index. Specifically, the acquisition method is similar to step a in step 303, which is not repeatedly described herein.

Step 305-3-1-b. The base station acquires a first cyclic shift and a second cyclic shift according to two $n'_p(n_s)$ acquired in step 305-3-1-a.

Specifically, first $n'_p(n_s)$ and second $n'_p(n_s)$ obtained in step 305-3-1-a can be calculated according to the cyclic shift calculation formula to obtain a first cyclic shift and a second cyclic shift.

Step 305-3-2. The base station determines the cyclic shift of the reference signal of the PUCCH according to the first cyclic shift and the second cyclic shift obtained in step 305-3-1.

For example, the base station may first determine the cyclic shift of the reference signal of the PUCCH according to the first cyclic shift and the second cyclic shift obtained in step 305-3-1 and then determine the type of the UCI transmitted on the PUCCH according to the determined cyclic shift of the reference signal of the PUCCH. For example, if the determined cyclic shift of the reference signal of the PUCCH is the first cyclic shift, the type of the UCI transmitted on the PUCCH is periodic CSI; if the determined cyclic shift of the reference signal of the PUCCH is the second cyclic shift, the type of the UCI transmitted on the PUCCH is periodic CSI and HARQ-ACK; and if the determined cyclic shift of the reference signal of the PUCCH is the second cyclic shift, and the uplink subframe for transmitting the PUCCH is a subframe which the UE transmits the SR on and is configured by a high layer, the type of the UCI transmitted on the PUCCH is periodic CSI, HARQ-ACK and an SR.

In this step, the base station may perform correlation operation by adopting the first cyclic shift and the second cyclic shift obtained in step 305-3-1 and the reference signal of the PUCCH to determine the cyclic shift of the reference signal of the PUCCH. The PUCCH herein refers to a PUCCH on which the UE transmits UCI, and the reference signal of the PUCCH herein refers to the reference signal received by the base station on the PUCCH on which the UE transmits UCI. Optionally, the method for determining the cyclic shift of the reference signal of the PUCCH from the first cyclic shift and the second cyclic shift may be implemented in the following manner: first, a first reference signal sequence and a second reference signal sequence are acquired from the first cyclic shift and the second cyclic shift; then, correlation operation is performed on the first reference signal sequence and the second reference signal sequence and the reference signal received on the PUCCH on which the UE transmits UCI, respectively, so as to determine whether the reference signal sequence used by the PUCCH is the first reference signal sequence or the second reference signal sequence, and determine whether the cyclic shift of the reference signal of the PUCCH is the first cyclic shift or the second cyclic shift.

Step 305-4. The base station receives the UCI transmitted by the UE on the PUCCH according to the orthogonal sequence and the cyclic shift of the reference signal.

In this step, the base station receives the UCI transmitted by the UE on the PUCCH, according to the orthogonal sequence obtained in step 305-2 and the cyclic shift of the reference signal obtained in step 305-3. Alternatively, it may be considered that the base station decodes the UCI transmitted by the UE on the PUCCH according to the orthogonal sequence obtained in step 305-2 and the cyclic shift of the reference signal obtained in step 305-3, so as to acquire the UCI transmitted by the UE.

Optionally, in this step, first the type of the UCI transmitted by the UE may further be determined according to the cyclic shift of the reference signal, and then the UCI is received on the PUCCH according to the orthogonal sequence, the cyclic shift of the reference signal, and the determined type of the UCI transmitted on the PUCCH, or it is considered that the UCI is decoded to acquire the UCI transmitted by the UE. Specifically, the method for determining the type of the UCI according to the cyclic shift of the reference signal of the PUCCH may be that: if the determined cyclic shift of the reference signal of the PUCCH is the first cyclic shift, the type of the UCI transmitted on the PUCCH is periodic CSI; if the determined cyclic shift of the reference signal of the PUCCH is the second cyclic shift, the type of the UCI transmitted on the PUCCH is periodic CSI and HARQ-ACK; if the determined cyclic shift of the reference signal of the PUCCH is the second cyclic shift, and the uplink subframe for transmitting the PUCCH is a subframe which the UE transmits the SR on and is configured by a high layer, the type of the UCI transmitted on the PUCCH is periodic CSI, HARQ-ACK and an SR. For example, in combination with the specific steps in the embodiments of the present application, the type of the UCI can be determined in the following manner: if the cyclic shift of the reference signal of the PUCCH determined in step 305-3-2 is the first cyclic shift obtained in step 305-3-1, the type of the UCI transmitted on the PUCCH is periodic CSI; if the cyclic shift of the reference signal of the PUCCH determined in step 305-3-2 is the second cyclic shift obtained in step 305-3-1, the type of the UCI transmitted on the PUCCH is periodic CSI and HARQ-ACK; if the cyclic shift of the reference signal of the PUCCH determined in step 305-3-2 is the second cyclic shift obtained in step 305-3-1, and the uplink subframe for transmitting the PUCCH is a subframe which the UE transmits the SR on and is configured by a high layer, the type of the UCI transmitted on the PUCCH is periodic CSI, HARQ-ACK and an SR.

Optionally, when the UCI transmitted on the PUCCH includes periodic CSI and HARQ-ACK, the implementation can further include the following steps.

Step 305-4-1. The base station acquires a resource occupied by the periodic CSI and acquires a resource occupied by the HARQ-ACK.

Step 305-4-1 is similar to step 304-1, which is not repeatedly described herein.

Step 305-4-2. The base station decodes the periodic CSI according to the resource occupied by the periodic CSI, so as to obtain the periodic CSI transmitted by the UE, and decodes the HARQ-ACK according to the resource occupied by the HARQ-ACK, so as to obtain the HARQ-ACK transmitted by the UE.

Step 305-4-2 may further be implemented through the following two steps.

Step 305-4-2-a. The base station separates, according to the resource occupied by the periodic CSI, modulation symbols corresponding to the periodic CSI on the PUCCH, and separates, according to the resource occupied by the HARQ-ACK, modulation symbols corresponding to the HARQ-ACK on the PUCCH.

For example, the base station may separate, in combination with the resource occupied by the periodic CSI and the resource occupied by the HARQ-ACK acquired in step 305-4-1, and further in combination with the method in which the UE collects encoded bits in the encoded bit sequence of the periodic CSI and encoded bits in the encoded bit sequence of the HARQ-ACK to obtain the encoded bit sequence of the UCI described in step 304-3, modulation symbols corresponding to the periodic CSI on the PUCCH, and modulation symbols corresponding to the HARQ-ACK.

Step 305-4-2-b. The base station decodes, according to the separated modulation symbols corresponding to the periodic CSI and the modulation symbols corresponding to the HARQ-ACK, the periodic CSI and the HARQ-ACK, so as to receive the periodic CSI and the HARQ-ACK transmitted on the PUCCH by the UE.

In the embodiment of the present application, a cyclic shift of a reference signal of a PUCCH channel for transmitting UCI is acquired according to a sequence index, and the UCI is transmitted on the PUCCH according to the cyclic shift and a corresponding orthogonal sequence, which can enhance transmission performance of the UCI.

At the same time, in the embodiment of the present application, one orthogonal sequence index of the PUCCH corresponds to cyclic shifts of two reference signals, and the two cyclic shifts are used for transmission of periodic CSI only and simultaneous transmission of periodic CSI and HARQ-ACK, respectively, so as to distinguish a case of transmitting periodic CSI only from a case of transmitting periodic CSI and HARQ-ACK at the same time.

In addition, in the embodiment of the present application, the periodic CSI and the HARQ-ACK are both distributed on the time and frequency resources of two slots of the PUCCH, and therefore better time and frequency diversity gains can be obtained for both the periodic CSI and the HARQ-ACK, so as to guarantee the transmission performance of the periodic CSI and the HARQ-ACK.

Figure 6:
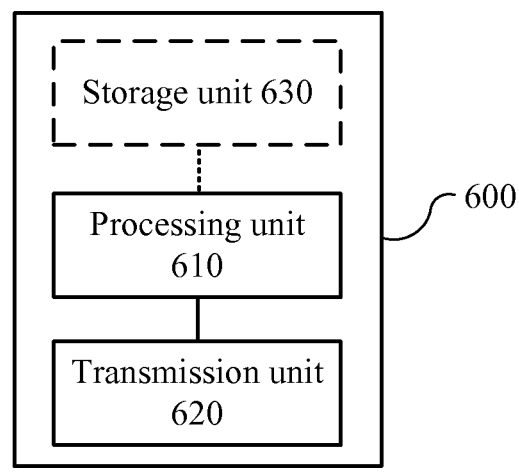
FIG. 6 is a block diagram of a user equipment according to an embodiment of the present application.

FIG. 6 is a block diagram of a user equipment according to an embodiment of the present application. The user equipment 600 in FIG. 6 includes a processing unit 610 and a transmission unit 620.

The processing unit 610 acquires a resource index of a physical uplink control channel PUCCH and UCI, where the PUCCH is used for transmitting UCI, acquires a sequence index of an orthogonal sequence of the PUCCH according to the resource index, acquires the orthogonal sequence according to the sequence index, and acquires a cyclic shift of a reference signal of the PUCCH according to the sequence index. The transmission unit 620 transmits the UCI to the base station on the PUCCH according to the orthogonal sequence acquired by the processing unit 610 and the cyclic shift acquired by the processing unit 610.

In the embodiment of the present application, a cyclic shift of a reference signal of a PUCCH channel for transmitting UCI is acquired according to a sequence index, and the UCI is transmitted on the PUCCH according to the cyclic shift and a corresponding orthogonal sequence, which can enhance transmission performance of the UCI.

All parts in the user equipment 600 in FIG. 6 may execute operations related to a user equipment in the embodiments in FIG. 1 to FIG. 3, respectively, and to avoid repetition, details are not repeatedly described herein.

Optionally, as another embodiment, the processing unit 610 may determine, the cyclic shift of the reference signal of the PUCCH according to the sequence index and the UCI.

In the embodiment of the present application, the cyclic shift of the reference signal of the PUCCH is acquired according to the sequence index and UCI, and the UCI is transmitted on the PUCCH according to the cyclic shift and a corresponding orthogonal sequence, so that the transmitted UCI can be distinguished through a cyclic shift, which can enhance transmission performance of the UCI.

Optionally, as another embodiment, if the UCI only includes periodic CSI, the processing unit 610 may determine that the cyclic shift is a first cyclic shift corresponding to the sequence index. If the UCI includes periodic CSI and HARQ-ACK or the UCI includes periodic CSI, HARQ-ACK and an SR, the processing unit 610 may determine that the cyclic shift is a second cyclic shift corresponding to the sequence index.

In the embodiment of the present application, one sequence index of a PUCCH corresponds to two cyclic shifts of a reference signal, and the two cyclic shifts are used for transmission of periodic CSI only and simultaneous transmission of periodic CSI and HARQ-ACK, respectively, so as to distinguish a case of transmitting periodic CSI only from a case of transmitting periodic CSI and HARQ-ACK at the same time, which can enhance transmission performance of the UCI.

Optionally, as another embodiment, the user equipment 600 further includes a storage unit 630. The storage unit 630 saves correspondence between a sequence index and a cyclic shift calculation factor of a reference signal. The processing unit 610 may acquire, according to the correspondence between a sequence index and a cyclic shift calculation factor of a reference signal saved in the storage unit 630, a first cyclic shift calculation factor and a second cyclic shift calculation factor corresponding to the sequence index; acquire a first cyclic shift according to the first cyclic shift calculation factor, and acquire a second cyclic shift according to the second cyclic shift calculation factor; and acquire the cyclic shift of the reference signal of the PUCCH according to the UCI.

Optionally, as another embodiment, the processing unit 610 may determine, according to the sequence index saved in the storage unit 630 and the UCI, a cyclic shift calculation factor of the reference signal of the PUCCH, where if the UCI only includes periodic CSI, the processing unit 610 may determine that the cyclic shift calculation factor of the reference signal of the PUCCH is the first cyclic shift calculation factor corresponding to the sequence index, if the UCI includes periodic CSI and HARQ-ACK or the UCI includes periodic CSI, HARQ-ACK and an SR, the processing unit 610 may determine that a cyclic shift calculation factor of the reference signal of the PUCCH is a second cyclic shift calculation factor corresponding to the sequence index; and acquire, according to the cyclic shift calculation factor, the cyclic shift of the reference signal of the PUCCH.

Optionally, as another embodiment, the processing unit 610 may acquire, according to the correspondence between a sequence index and a cyclic shift calculation factor of a reference signal saved in the storage unit 630, a first cyclic shift calculation factor corresponding to the sequence index or a second cyclic shift calculation factor corresponding to the sequence index.

Optionally, as another embodiment, a difference between a value of the first cyclic shift calculation factor and a value of the second cyclic shift calculation factor saved in the storage unit 630 may be 1.

Optionally, as another embodiment, the correspondence between a sequence index and a cyclic shift calculation factor of a reference signal saved in the storage unit 630 may be that at a given spreading coefficient, one sequence index corresponds to two cyclic shift calculation factors; and at a given spreading coefficient, a distance between cyclic shift calculation factors corresponding to different sequence indexes is greater than or equal to a distance between two cyclic shift calculation factors corresponding to a same sequence index, or a minimum value of the distance between cyclic shift calculation factors corresponding to different sequence indexes is 2.

Optionally, as another embodiment, in the case that the PUCCH is in PUCCH format 3, one example of the correspondence between a sequence index and a cyclic shift calculation factor of a reference signal saved in the storage unit 630 is shown in Table 1.

In the embodiment of the present application, the distance between the cyclic shift calculation factors corresponding to different sequence indexes should be as large as possible to guarantee that a distance between the cyclic shifts of the reference signals of different users is as large as possible, so as to achieve better orthogonality and reduce interference between different users.

Optionally, as another embodiment, in the case that the PUCCH is in PUCCH format 3, another example of the correspondence between a sequence index and a cyclic shift calculation factor of a reference signal saved in the storage unit 630 is shown in Table 2.

In the embodiment of the present application, a minimum distance between random two cyclic shift calculation factors corresponding to different sequence indexes is 2, which can guarantee orthogonality between reference signal sequences of different users, so as to further reduce interference between different users.

Optionally, as another embodiment, if the UCI includes periodic CSI and HARQ-ACK, the transmission unit 620 may acquire a resource occupied by the periodic CSI, and acquire a resource occupied by the HARQ-ACK; perform, according to the resource occupied by the periodic CSI, channel encoding on the periodic CSI to obtain an encoded bit sequence of the periodic CSI, and perform, according to the resource occupied by the HARQ-ACK, channel encoding on the HARQ-ACK to obtain an encoded bit sequence of the HARQ-ACK; and transmit the encoded bit sequence of the periodic CSI and the encoded bit sequence of the HARQ-ACK to the base station on the PUCCH according to the orthogonal sequence and the cyclic shift.

Optionally, as another embodiment, the transmission unit 620 may collect encoded bits in the encoded bit sequence of the periodic CSI and encoded bits in the encoded bit sequence of the HARQ-ACK, so as to obtain an encoded bit sequence of the UCI; and transmit the encoded bit sequence of the UCI to the base station on the PUCCH according to the orthogonal sequence and the cyclic shift.

Optionally, as another embodiment, the resource is the number of encoded bits, and the transmission unit 620 may acquire, according to the formula $Q_{ACK}=\lceil[(O_{ACK}*24*\beta'_{offset})/(O_{CSI}+O_{ACK})]\rceil*Q_m$, the number of encoded bits occupied by the HARQ-ACK, and acquire, according to the formula $Q_{CSI}=48-Q_{ACK}$ the number of encoded bits occupied by the CSI, where $Q_{ACK}$ is the number of encoded bits occupied by the HARQ-ACK, $Q_{CSI}$ is the number of encoded bits occupied by the periodic CSI, $\beta'_{offset}$ is a value semi-statically configured by the base station through high-layer signaling or a preset value or a value dynamically specified by the base station, $O_{ACK}$ is the number of information bits of the HARQ-ACK, $O_{CSI}$ is the number of information bits of the periodic CSI, $Q_m$ is a modulation order of the UCI; or, the resource is the number of modulation symbols, and the transmission unit 620 may acquire, according to the formula $Q'_{ACK}=\lceil(O_{ACK}*24*\beta'_{offset})(O_{CSI}+O_{ACK})\rceil$, the number of modulation symbols occupied by the HARQ-ACK, and acquire, according to the formula $Q'_{CSI}=24-Q'_{ACK}$, the number of modulation symbols occupied by the periodic CSI, where $Q'_{ACK}$ is the number of modulation symbols occupied by the HARQ-ACK, $Q'_{CSI}$ is the number of modulation symbols occupied by the periodic CSI, $\beta'_{offset}$ is a value semi-statically configured by the base station through high-layer signaling or a preset value or a value dynamically specified by the base station, $O_{ACK}$ is the number of information bits of the HARQ-ACK, $O_{CSI}$ is the number of information bits of the periodic CSI, and $Q_m$ is a modulation order of the UCI.

Optionally, as another embodiment, the transmission unit 620 may divide the encoded bit sequence of the periodic CSI into a first part of the encoded bit sequence of the periodic CSI and a second part of the encoded bit sequence of the periodic CSI, and divide the encoded bit sequence of the HARQ-ACK into a first part of the encoded bit sequence of the HARQ-ACK and a second part of the encoded bit sequence of the HARQ-ACK; the first part of the encoded bit sequence of the periodic CSI, the second part of the encoded bit sequence of the periodic CSI, the first part of the encoded bit sequence of the HARQ-ACK, and the second part of the encoded bit sequence of the HARQ-ACK may be collected, so as to obtain an encoded bit sequence of the UCI.

Currently, when periodic CSI and HARQ-ACK are transmitted on a physical uplink control channel at the same time, problems of how to properly allocate resources and how to map the periodic CSI and the HARQ-ACK on time and frequency resources also need to be solved, so as to better guarantee transmission performance of the periodic CSI and the HARQ-ACK. In the embodiment of the present application, the periodic CSI and the HARQ-ACK are both distributed on the time and frequency resources of two slots of the PUCCH, and therefore better time and frequency diversity gains can be obtained for both the periodic CSI and the HARQ-ACK, so as to guarantee the transmission performance of the periodic CSI and the HARQ-ACK.

Optionally, as another embodiment, the transmission unit 620 may perform collection in the following order: the first part of the encoded bit sequence of the HARQ-ACK, the first part of the encoded bit sequence of the periodic CSI, the second part of the encoded bit sequence of the HARQ-ACK, and the second part of the encoded bit sequence of the periodic CSI.

Optionally, as another embodiment, if the encoded bit sequence of the periodic CSI is $q_0^{CSI}, q_1^{CSI}, q_2^{CSI}, \ldots, q_{Q_{CSI}-1}^{CSI}$, the transmission unit 620 is specifically configured to divide the encoded bit sequence of the periodic CSI into: a first part of the encoded bit sequence of the periodic CSI and a second part of the encoded bit sequence of the periodic CSI, the first part of the encoded bit sequence of the periodic CSI $q_0^{CSI}, q_1^{CSI}, q_2^{CSI}, \ldots, q_{(12-\lceil(Q_{ACK}/2)/2\rceil)*2-}^{CSI}$, and the second part of the encoded bit sequence of the periodic CSI is $q_{(12-\lceil(Q_{ACK}/2)/2\rceil)*2}^{CSI}, q_{(12-\lceil(Q_{ACK}/2)/2\rceil)*2+1}^{CSI}$; if the encoded bit sequence of the HARQ-ACK is $q_0^{ACK}, q_1^{ACK}, q_2^{ACK}, \ldots, q_{Q_{ACK}-1}^{ACK}$, the transmission unit 620 is specifically configured to divide the encoding bit sequence of the HARQ-ACK into the first part of the encoded bit sequence of the HARQ-ACK and a second part of the encoded bit sequence of the HARQ-ACK, the first part of the encoded bit sequence of the HARQ-ACK is $q_0^{ACK}$, $q_1^{ACK}, q_2^{ACK}, \ldots, q_{[(Q_{ACK}/2)*2]-1}^{ACK}$, and the second part of the encoded bit sequence of the HARQ-ACK $q_{[(Q_{ACK}/2)/2]*2}^{ACK}, q_{[(Q_{ACK}/2)/2]*2+1}^{ACK}, \ldots q_{Q_{ACK}-1}^{ACK}$.

Optionally, as another embodiment, the transmission unit 620 may determine a first UCI encoded bit sequence and a second UCI encoded bit sequence, where the number of encoded bits of the first UCI encoded bit sequence is smaller than or equal to the number of encoded bits of the second UCI encoded bit sequence; the first UCI encoded bit sequence is divided into a first part of the first UCI encoded bit sequence and a second part of the first UCI encoded bit sequence, and the second UCI encoded bit sequence is divided into a first part of the second UCI encoded bit sequence and a second part of the second UCI encoded bit sequence; by taking encoded bits of the number being a modulation order $Q_m$ of the UCI as a granularity, encoded bits is alternately selected from the first part of the first UCI encoded bit sequence and the first part of the second UCI encoded bit sequence, and encoded bits is first selected from the first part of the first UCI encoded bit sequence, so as to obtain a first part of the encoded bit sequence of the UCI; by taking encoded bits of the number being the modulation order $Q_m$ as a granularity, encoded bits is alternately selected from the second part of the first UCI encoded bit sequence and the second part of the second UCI encoded bit sequence, and encoded bits is first selected from the second part of the first UCI encoded bit sequence, so as to obtain a second part of the encoded bit sequence of the UCI; and the first part of the encoded bit sequence of the UCI and the second part of the encoded bit sequence of the UCI are serially connected to obtain the encoded bit sequence of the UCI.

Currently, when periodic CSI and HARQ-ACK are transmitted on a physical uplink control channel at the same time, problems of how to properly allocate resources and how to map the periodic CSI and the HARQ-ACK on time and frequency resources also need to be solved, so as to better guarantee transmission performance of the periodic CSI and the HARQ-ACK. In the embodiment of the present application, the periodic CSI and the HARQ-ACK are distributed on the frequency domain resources of each slot of the PUCCH more discretely to obtain more frequency diversity gains, so as to further enhance the transmission performance of the periodic CSI and the HARQ-ACK.

Optionally, as another embodiment, if the number of encoded bits in the encoded bit sequence of the periodic CSI is smaller than the number of encoded bits in the encoded bit sequence of the HARQ-ACK, the transmission unit 620 may determine that the first UCI encoded bit sequence is the encoded bit sequence of the periodic CSI and the second UCI encoded bit sequence is the encoded bit sequence of the HARQ-ACK; or, if the number of encoded bits in the encoded bit sequence of the periodic CSI is greater than the number of encoded bits in the encoded bit sequence of the HARQ-ACK, the transmission unit 620 may determine that the first UCI encoded bit sequence is the encoded bit sequence of the HARQ-ACK and the second UCI encoded bit sequence is the encoded bit sequence of the periodic CSI; or, if the number of encoded bits in the encoded bit sequence of the periodic CSI is equal to the number of encoded bits in the encoded bit sequence of the HARQ-ACK, the transmission unit 620 may determine that the first UCI encoded bit sequence is the encoded bit sequence of the periodic CSI and the second UCI encoded bit sequence is the encoded bit sequence of the HARQ-ACK, or determine that the first UCI encoded bit sequence is the encoded bit sequence of the HARQ-ACK and the second UCI encoded bit sequence is the encoded bit sequence of the periodic CSI.

Figure 7:
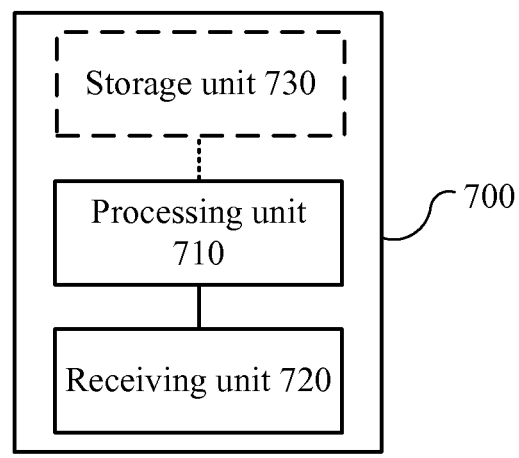
FIG. 7 is a block diagram of a base station according to an embodiment of the present application.

FIG. 7 is a block diagram of a base station according to an embodiment of the present application. The base station 700 in FIG. 7 includes a processing unit 710 and a receiving unit 720.

The processing unit 710 acquires a resource index of a physical uplink control channel PUCCH on which a user equipment UE transmits uplink control information UCI, acquires a sequence index of an orthogonal sequence of the PUCCH according to the resource index, acquires the orthogonal sequence according to the sequence index, and acquires a cyclic shift of a reference signal of the PUCCH according to the sequence index. The receiving unit 720 receives the UCI transmitted by the UE on the PUCCH according to the orthogonal sequence acquired by the processing unit 710 and the cyclic shift acquired by the processing unit 710.

In the embodiment of the present application, a cyclic shift of a reference signal of a PUCCH channel for transmitting UCI is acquired according to a sequence index, and the UCI is transmitted on the PUCCH according to the cyclic shift and a corresponding orthogonal sequence, which can enhance transmission performance of the UCI.

All parts in the base station 700 in FIG. 7 may execute operations related to a base station in the embodiments in FIG. 1 to FIG. 3, respectively, and to avoid repetition, details are not repeatedly described herein.

Optionally, as one embodiment, the processing unit 710 may determine the type of the UCI according to the cyclic shift of the reference signal of the PUCCH, where if the cyclic shift of the reference signal of the PUCCH is a first cyclic shift corresponding to the sequence index, determine that the type of the UCI is periodic CSI; and if the cyclic shift of the reference signal of the PUCCH is a second cyclic shift corresponding to the sequence index, determine that the type of the UCI is periodic CSI and HARQ-ACK. The receiving unit 720 receives the UCI transmitted by the UE on the PUCCH according to the orthogonal sequence, the cyclic shift and the type of the UCI.

In the embodiment of the present application, the type of the UCI is determined from the cyclic shift of the reference signal of the PUCCH, so that the transmitted UCI can be distinguished through a cyclic shift, which can enhance transmission performance of the UCI.

Optionally, as another embodiment, the base station 700 further includes a storage unit 730. The storage unit 730 saves correspondence between a sequence index and a cyclic shift calculation factor of a reference signal. The processing unit 710 may acquire, according to the correspondence between a sequence index and a cyclic shift calculation factor of a reference signal saved in the storage unit 730, a first cyclic shift calculation factor and a second cyclic shift calculation factor corresponding to the sequence index; acquire, according to the first cyclic shift calculation factor, the first cyclic shift corresponding to the sequence index, and acquire, according to the second cyclic shift calculation factor, the second cyclic shift corresponding to the sequence index; and acquire, according to the first cyclic shift and the second cyclic shift, the cyclic shift of the reference signal of the PUCCH.

Optionally, as another embodiment, a difference between a value of the first cyclic shift calculation factor and a value of the second cyclic shift calculation factor saved in the storage unit 730 may be 1.

Optionally, as another embodiment, the correspondence between a sequence index and a cyclic shift calculation factor of a reference signal saved in the storage unit 730 may be that at a given spreading coefficient, one sequence index corresponds to two cyclic shift calculation factors; and at a given spreading coefficient, a distance between cyclic shift calculation factors corresponding to different sequence indexes is greater than or equal to a distance between two cyclic shift calculation factors corresponding to a same sequence index, or a minimum value of the distance between cyclic shift calculation factors corresponding to different sequence indexes is 2.

Optionally, as another embodiment, in the case that the PUCCH is in PUCCH format 3, one example of the correspondence between a sequence index and a cyclic shift calculation factor of a reference signal saved in the storage unit 730 is shown in Table 1.

In the embodiment of the present application, the distance between the cyclic shift calculation factors corresponding to different sequence indexes should be as large as possible to guarantee that a distance between the cyclic shifts of the reference signals of different users is as large as possible, so as to achieve better orthogonality and reduce interference between different users.

Optionally, as another embodiment, in the case that the PUCCH is in PUCCH format 3, another example of the correspondence between a sequence index and a cyclic shift calculation factor of a reference signal saved in the storage unit 730 is shown in Table 2.

In the embodiment of the present application, a minimum distance between random two cyclic shift calculation factors corresponding to different sequence indexes is 2, which can guarantee orthogonality between reference signal sequences of different users, so as to further reduce interference between different users.

Optionally, as another embodiment, if the UCI includes periodic CSI and HARQ-ACK, the receiving unit 720 may acquire a resource occupied by the periodic CSI, and acquire a resource occupied by the HARQ-ACK; decode, according to the resource occupied by the periodic CSI, the periodic CSI, and decode, according to the resource occupied by the HARQ-ACK, the HARQ-ACK.

Optionally, as another embodiment, the resource may be the number of encoded bits, the receiving unit 720 may acquire, according to the formula $Q_{ACK} = \lceil (O_{ACK} * 24 * \beta'_{offset}) / (O_{CSI} + O_{ACK}) \rceil * Q_m$, the number of encoded bits occupied by the HARQ-ACK, and acquire, according to the formula $Q_{CSI} = 48 - Q_{ACK}$, the number of encoded bits occupied by the CSI, where $Q_{ACK}$ is the number of encoded bits occupied by the HARQ-ACK, $Q_{CSI}$ is the number of encoded bits occupied by the periodic CSI, $\beta'_{offset}$ is a value semi-statically configured for the UE by the base station through high-layer signaling or a preset value or a value dynamically specified for the UE by the base station, $O_{ACK}$ is the number of information bits of the HARQ-ACK, $O_{CSI}$ is the number of information bits of the periodic CSI, $Q_m$ is a modulation order of the UCI; or, when the resource is the number of modulation symbols, acquire, according to the formula $Q'_{ACK} = \lceil (O_{ACK} * 24 * \beta'_{offset}) / (O_{CSI} + O_{ACK}) \rceil$, the number of modulation symbols occupied by the HARQ-ACK, and acquire, according to the formula $Q'_{CSI} = 24 - Q'_{ACK}$, the number of modulation symbols occupied by the CSI, where $Q'_{ACK}$ is the number of modulation symbols occupied by the HARQ-ACK, $Q'_{CSI}$ is the number of modulation symbols occupied by the periodic CSI, $\beta'_{offset}$ is a value semi-statically configured for the UE by the base station through high-layer signaling or a preset value or a value dynamically specified for the UE by the base station, $O_{ACK}$ is the number of information bits of the HARQ-ACK, $O_{CSI}$ is the number of information bits of the periodic CSI, and $Q_m$ is a modulation order of the UCI.

Optionally, as another embodiment, the receiving unit 720 may separate, according to the resource occupied by the periodic CSI and a manner in which the UE acquires the encoded bit sequence of the UCI, modulation symbols corresponding to the periodic CSI on the PUCCH, and separate, according to the resource occupied by the HARQ-ACK and a method in which the UE acquires the encoded bit sequence of the UCI, modulation symbols corresponding to the HARQ-ACK on the PUCCH; decode, according to the modulation symbols corresponding to the periodic CSI, the periodic CSI, and decode, according to the modulation symbols corresponding to the HARQ-ACK, the HARQ-ACK.

Optionally, as another embodiment, a manner in which the UE acquires the encoded bit sequence of the UCI used by the receiving unit 720 can be that, the encoded bit sequence of the periodic CSI may be divided into a first part of the encoded bit sequence of the periodic CSI and a second part of the encoded bit sequence of the periodic CSI, and the encoded bit sequence of the HARQ-ACK is divided into a first part of the encoded bit sequence of the HARQ-ACK and a second part of the encoded bit sequence of the HARQ-ACK; the first part of the encoded bit sequence of the periodic CSI, the second part of the encoded bit sequence of the periodic CSI, the first part of the encoded bit sequence of the HARQ-ACK, and the second part of the encoded bit sequence of the HARQ-ACK are collected in preset order, so as to obtain an encoded bit sequence of the UCI, where the preset order is: the first part of the encoded bit sequence of the HARQ-ACK, the first part of the encoded bit sequence of the periodic CSI, the second part of the encoded bit sequence of the HARQ-ACK, and the second part of the encoded bit sequence of the periodic CSI.

Currently, when periodic CSI and HARQ-ACK are transmitted on a physical uplink control channel at the same time, problems of how to properly allocate resources and how to map the periodic CSI and the HARQ-ACK on time and frequency resources also need to be solved, so as to better guarantee transmission performance of the periodic CSI and the HARQ-ACK. In the embodiment of the present application, the periodic CSI and the HARQ-ACK are both distributed on the time and frequency resources of two slots of the PUCCH, and therefore better time and frequency diversity gains can be obtained for both the periodic CSI and the HARQ-ACK, so as to guarantee the transmission performance of the periodic CSI and the HARQ-ACK.

The communications system according to the embodiment of the present application can include the user equipment 600 or the base station 700.

A person of ordinary skill in the art may may be aware that, units and algorithm steps of each example described in combination with the embodiments disclosed herein may be implemented by electronic hardware or a combination of computer software and electronic hardware. Whether the functions are performed using hardware or software depends on particular applications and design constraint conditions of the technical solutions. A person skilled in the art may use different methods to implement the described functions for each specific application may be aware that, units and algorithm steps of each example described beyond the scope of the present application.

A person of ordinary skill in the art may clearly understand that, for the purpose of convenient and brief description, for a detailed working process of the foregoing system, apparatus, and unit, reference may be made to the corresponding process in the foregoing method embodiments, and details are not repeatedly described herein.

In the several embodiments provided by the present application, it should be understood that the disclosed system, apparatus, and method may be implemented in other manners. For example, the described apparatus embodiment is merely exemplary. For example, dividing of the units is merely a type of logical function dividing, and there may be other dividing manners during actual implementation. For example, multiple units or components may be combined or integrated to another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated. Parts displayed as units may or may not be physical units, may be located in one position, or may be distributed to a plurality of network units. A part or all of the units may be selected according to actual needs to achieve the objectives of the solutions of the embodiments.

In addition, functional units in the embodiments of the present application may be integrated in one processing unit, each of the units may exist alone physically, and two or more units may also be integrated into one unit.

When the function is implemented in a form of a software functional unit and sold or used as an independent product, the function may be stored in a computer-readable storage medium. Based on such understanding, the technical solutions of the present application essentially, or the part contributing to the prior art, or all or a part of the technical solutions may be embodied in a form of a software product. The computer software product may be stored in a storage medium and includes several instructions for instructing a computer device (which may be a personal computer, a server, or network device, or the like) to perform all or a part of the steps of the method described in the embodiments of the present application. The foregoing storage medium includes any medium that is capable of storing program codes, such as a USB flash drive, a mobile hard disk, a read-only memory (ROM), a random access memory (RAM), a magnetic disk or an optical disc.

The foregoing description is merely specific embodiments of the present application, but is not intended to limit the scope of the present application. Any variation or replacement readily figured out by a person skilled in the art within the technical scope disclosed in the present application should fall within the protection scope of the present application. Therefore, the protection scope of the present application is subject to the protection scope of the claims.

The invention claimed is:

1. A method for transmitting control information, comprising:
    acquiring a resource index of a physical uplink control channel (PUCCH), wherein the PUCCH is used for transmitting uplink control information (UCI);
    acquiring a sequence index of an orthogonal sequence of the PUCCH according to the acquired resource index;
    acquiring the orthogonal sequence according to the acquired sequence index;
    acquiring a cyclic shift of a reference signal of the PUCCH according to the acquired sequence index; and
    transmitting the UCI to a base station on the PUCCH according to the acquired orthogonal sequence and the acquired cyclic shift, wherein
        the acquiring a cyclic shift of a reference signal of the PUCCH according to the acquired sequence index comprises:
        determining, if the UCI only comprises periodic channel state information (CSI), that the cyclic shift is a first cyclic shift corresponding to the acquired sequence index, and
        determining, if the UCI comprises periodic CSI and hybrid automatic repeat request-acknowledgment (HARQ-ACK) or the UCI comprises periodic CSI, HARQ-ACK and a scheduling request (SR), that the cyclic shift is a second cyclic shift corresponding to the acquired sequence index.

2. The method according to claim 1, wherein the transmitting the UCI to a base station on the PUCCH according to the acquired orthogonal sequence and the acquired cyclic shift comprises:
    if the UCI comprises periodic CSI and HARQ-ACK,
        acquiring a resource occupied by the periodic CSI, and acquiring a resource occupied by the HARQ-ACK;
        performing, according to the acquired resource occupied by the periodic CSI, channel encoding on the periodic CSI to obtain an encoded bit sequence of the periodic CSI, and performing, according to the acquired resource occupied by the HARQ-ACK, channel encoding on the HARQ-ACK to obtain an encoded bit sequence of the HARQ-ACK; and
        transmitting the encoded bit sequence of the periodic CSI and the encoded bit sequence of the HARQ-ACK to the base station on the PUCCH according to the acquired orthogonal sequence and the acquired cyclic shift.

3. The method according to claim 2, wherein the transmitting the encoded bit sequence of the periodic CSI and the encoded bit sequence of the HARQ-ACK to the base station on the PUCCH according to the acquired orthogonal sequence and the acquired cyclic shift comprises:
    collecting encoded bits in the encoded bit sequence of the periodic CSI and encoded bits in the encoded bit sequence of the HARQ-ACK, so as to obtain an encoded bit sequence of the UCI; and
    transmitting the encoded bit sequence of the UCI to the base station on the PUCCH according to the acquired orthogonal sequence and the acquired cyclic shift.

4. A method for transmitting control information, comprising:
    acquiring a resource index of a physical uplink control channel (PUCCH) on which a user equipment UE transmits uplink control information (UCI);
    acquiring a sequence index of an orthogonal sequence of the PUCCH according to the acquired resource index;
    acquiring the orthogonal sequence according to the acquired sequence index;
    acquiring a cyclic shift of a reference signal of the PUCCH according to the acquired sequence index; and
    receiving the UCI transmitted by the UE on the PUCCH according to the acquired orthogonal sequence and the acquired cyclic shift, wherein the receiving the UCI transmitted by the UE on the PUCCH according to the acquired orthogonal sequence and the acquired cyclic shift comprises:

determining a type of the UCI according to the acquired cyclic shift of the reference signal of the PUCCH by, if the acquired cyclic shift of the reference signal of the PUCCH is a first cyclic shift corresponding to the acquired sequence index, determining that the type of the UCI is periodic channel state information (CSI), and if the acquired cyclic shift of the reference signal of the PUCCH is a second cyclic shift corresponding to the acquired sequence index, determining that the type of the UCI is periodic CSI and hybrid automatic repeat request-acknowledgment (HARQ-ACK), and receiving the UCI transmitted by the UE on the PUCCH according to the acquired orthogonal sequence, the acquired cyclic shift and the determined type of the UCI.

5. The method according to claim 4, wherein the receiving the UCI transmitted by the UE on the PUCCH according to the acquired orthogonal sequence and the acquired cyclic shift comprises:

if the UCI comprises periodic CSI and HARQ-ACK, acquiring a resource occupied by the periodic CSI, and acquiring a resource occupied by the HARQ-ACK; and decoding the periodic CSI according to the acquired resource occupied by the periodic CSI, and decoding the HARQ-ACK according to the acquired resource occupied by the HARQ-ACK.

6. A user equipment, comprising:

at least one memory storing instructions; and at least one processor executing the instructions to provide:

a processing unit, configured to acquire a resource index of a physical uplink control channel (PUCCH) and uplink control information (UCI), wherein the PUCCH is used for transmitting the UCI; acquire a sequence index of an orthogonal sequence of the PUCCH according to the acquired resource index; acquire the orthogonal sequence according to the acquired sequence index; and acquire a cyclic shift of a reference signal of the PUCCH according to the acquired sequence index; and a transmission unit, configured to transmit, according to the orthogonal sequence acquired by the processing unit and the cyclic shift acquired by the processing unit, the UCI to a base station on the PUCCH, wherein the processing unit is configured to if the UCI only comprises periodic channel state information (CSI), determine that the cyclic shift is a first cyclic shift corresponding to the acquired sequence index, and if the UCI comprises periodic CSI and hybrid automatic repeat request-acknowledgment (HARQ-ACK) or the UCI comprises periodic CSI, HARQ-ACK and a scheduling request (SR), determine that the cyclic shift is a second cyclic shift corresponding to the acquired sequence index.

7. The user equipment according to claim 6, wherein the transmission unit is configured to acquire, if the UCI comprises periodic CSI and HARQ-ACK, a resource occupied by the periodic CSI and a resource occupied by the HARQ-ACK;

perform, according to the acquired resource occupied by the periodic CSI, channel encoding on the periodic CSI to obtain an encoded bit sequence of the periodic CSI, and perform, according to the acquired resource occupied by the HARQ-ACK, channel encoding on the HARQ-ACK to obtain an encoded bit sequence of the HARQ-ACK; and transmit the encoded bit sequence of the periodic CSI and the encoded bit sequence of the HARQ-ACK to the base station on the PUCCH according to the acquired orthogonal sequence and the acquired cyclic shift.

8. The user equipment according to claim 7, wherein the transmission unit is configured to collect encoded bits in the encoded bit sequence of the periodic CSI and encoded bits in the encoded bit sequence of the HARQ-ACK, so as to obtain an encoded bit sequence of the UCI; and transmit the encoded bit sequence of the UCI to the base station on the PUCCH according to the acquired orthogonal sequence and the acquired cyclic shift.

9. A base station, comprising:

at least one memory storing instructions; and at least one processor executing the instructions to provide:

a processing unit, configured to acquire a resource index of a physical uplink control channel (PUCCH) on which a user equipment UE transmits uplink control information (UCI); acquire a sequence index of an orthogonal sequence of the PUCCH according to the acquired resource index; acquire the orthogonal sequence according to the acquired sequence index; and acquire a cyclic shift of a reference signal of the PUCCH according to the acquired sequence index; and a receiving unit, configured to receive the UCI transmitted by the UE on the PUCCH according to the orthogonal sequence acquired by the processing unit and the cyclic shift acquired by the processing unit, wherein the processing unit is further configured to determine a type of the UCI according to the acquired cyclic shift of the reference signal of the PUCCH by, if the acquired cyclic shift of the reference signal of the PUCCH is a first cyclic shift corresponding to the acquired sequence index, determine that the type of the UCI is periodic channel state information (CSI), and if the acquired cyclic shift of the reference signal of the PUCCH is a second cyclic shift corresponding to the according sequence index, determine that the type of the UCI is periodic CSI and hybrid automatic repeat request-acknowledgment (HARQ-ACK), and the receiving unit is configured to receive the UCI transmitted by the UE on the PUCCH according to the acquired orthogonal sequence, the acquired cyclic shift and the determined type of the UCI.

10. The base station according to claim 9, wherein the receiving unit is configured to acquire, if the UCI comprises periodic CSI and HARQ-ACK, a resource occupied by the periodic CSI, and a resource occupied by the HARQ-ACK;

decode, according to the acquired resource occupied by the periodic CSI, the periodic CSI, and decode, according to the acquired resource occupied by the HARQ-ACK, the HARQ-ACK.

* * * * *